(12) United States Patent
Okada et al.

(10) Patent No.: US 6,956,633 B2
(45) Date of Patent: Oct. 18, 2005

(54) ACTIVE MATRIX TYPE LIQUID CRYSTAL DISPLAY APPARATUS

(75) Inventors: Yoshihiro Okada, Soraku-gun (JP); Atsushi Ban, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 87 days.

(21) Appl. No.: 10/624,935

(22) Filed: Jul. 21, 2003

(65) Prior Publication Data

US 2004/0017521 A1 Jan. 29, 2004

Related U.S. Application Data

(62) Division of application No. 09/821,717, filed on Mar. 29, 2001, now Pat. No. 6,633,360.

(30) Foreign Application Priority Data

| Mar. 30, 2000 | (JP) | ........................................ | 2000-094314 |
| Mar. 30, 2000 | (JP) | ........................................ | 2000-094330 |

(51) Int. Cl.$^7$ ............................................ G02F 1/1343
(52) U.S. Cl. ......................... 349/139; 349/143; 349/44
(58) Field of Search ................................ 349/143, 139, 349/44, 43, 38, 110

(56) References Cited

U.S. PATENT DOCUMENTS

| 4,783,149 | A | | 11/1988 | Umeda et al. |
| 5,040,875 | A | | 8/1991 | Noguchi |
| 5,406,398 | A | | 4/1995 | Suzuki et al. |
| 5,535,028 | A | | 7/1996 | Bae et al. |
| 5,831,708 | A | * | 11/1998 | Hiraishi et al. ............. 349/143 |
| 5,953,088 | A | * | 9/1999 | Hanazawa et al. .......... 349/110 |
| 6,172,729 | B1 | | 1/2001 | Ikeda |
| 6,320,636 | B2 | * | 11/2001 | Zhang et al. ................ 349/139 |
| 6,525,798 | B1 | | 2/2003 | Yamakita et al. |
| 6,538,713 | B1 | | 3/2003 | Yanagawa et al. |
| 6,633,360 | B2 | * | 10/2003 | Okada et al. ................ 349/145 |
| 6,724,452 | B1 | * | 4/2004 | Takeda et al. .............. 349/139 |
| 6,781,658 | B1 | * | 8/2004 | Choi ........................... 349/139 |

FOREIGN PATENT DOCUMENTS

| JP | 4121712 | 4/1992 |
| JP | 06250220 A | 9/1994 |
| JP | 9090318 | 4/1997 |
| JP | 10253988 | 9/1998 |

* cited by examiner

*Primary Examiner*—Toan Ton
(74) *Attorney, Agent, or Firm*—David G. Conlin; William J. Daley, jr.; Edwards & Angell, LLP

(57) ABSTRACT

In an active matrix type liquid crystal display apparatus, each of pixel electrodes has overhanging portions at its opposite side edges. These overhanging portions of the pixel electrode cover two signal lines placed on opposite sides of the pixel electrode, respectively.

16 Claims, 21 Drawing Sheets

AMOUNT OF CHANGE OF (Csd1−Csd2)
RELATIVE TO ALIGNMENT DEVIATION dx

| dx (μm) | CONVENTIONAL STRUCTURE | EMBODIMENT |
|---|---|---|
| 0.0 | 0.0% | 0.0% |
| 0.7 | 9.4% | 2.2% |
| 1.0 | 13.4% | 3.3% | ns
ACTIVE MATRIX TYPE LIQUID CRYSTAL DISPLAY APPARATUS

This application is a divisional of U.S. application Ser. No. 09/821,717, filed Mar. 29, 2001, now U.S. Pat. No. 6,633,360, the teachings of which are incorporated herein by reference in their entirety.

BACKGROUND OF THE INVENTION

The present invention relates to an active matrix type liquid crystal display apparatus for use in a liquid crystal television set, a notebook personal computer, and the like.

FIGS. 24 and 25 are a plan view and a sectional view, respectively, of a conventional active matrix type liquid crystal display apparatus. The active matrix type liquid crystal display apparatus is constituted essentially of a liquid crystal panel 1, a gate driver 2, a source driver 3, and a backlight 4.

The liquid crystal panel 1 has an active matrix board 5, an opposed board 6, a liquid crystal layer 7 sandwiched between the active matrix board 5 and the opposed board 6, and a polarizer (not shown) attached to the outer side of each of the active matrix board 5 and the opposed board 6.

On an insulation substrate 5a of the active matrix board 5, there are provided a plurality of scanning lines (not shown) disposed parallel with one another, a plurality of signal lines 9 parallel with one another and orthogonal to the scanning lines with an insulation film 8 disposed between the signal lines and the scanning lines, thin film transistors (TFTs) 10 disposed in the vicinity of intersections of the scanning lines and the signal lines 9, and a plurality of pixel electrodes 11 disposed in regions surrounded with the scanning lines and the signal lines 9.

FIG. 26 is a plan view showing a one-pixel part of the active matrix board 5. Because the pixel electrode 11 and the signal line 9 are formed in the same layer, the pixel electrode 11 is spaced at a predetermined interval from the signal line 9 to prevent the pixel electrode 11 from contacting the signal line 9. In the TFT 10 which is a three-terminal element, electrical continuity between a drain electrode 13 and a source electrode 14 is controlled by a voltage applied to a gate electrode 12. The gate electrode 12 is connected to a scanning line 15 adjacent thereto. The source electrode 14 is connected to the signal line 9 adjacent thereto. The drain electrode 13 is connected to the pixel electrode 11.

The opposed board 6 is provided with color filters 16 formed in the order of red, green, and blue at positions corresponding to each pixel electrode 11. A black matrix 17 is formed between the adjacent color filters 16 and 16. The black matrix 17 serves as a light shield film for preventing leak of light from the gap between the pixel electrode 11 and the scanning line 15 as well as the signal line 9. An opposed electrode 18 made of a transparent conductive material is formed on a layer of the black matrix 17 and the color filters 16. The gate driver 2 and the source driver 3 are connected to terminals of the scanning lines 15 and those of the signal lines 9, respectively, disposed on the periphery of the liquid crystal panel 1.

The method of driving the active matrix type liquid crystal display apparatus having the construction will be described below.

When writing to an array of pixels of an nth row, an ON-signal (electric potential Vgh at which the TFT 10 is turned on) is input to a scanning line 15n of the nth row from the gate driver 2. At this time, an OFF-signal (electric potential Vgl at which the TFT 10 is turned off) is input to scanning lines other than the scanning line 15n. Thus, only the TFTs 10 of the nth row are turned on. On the other hand, source signals having voltages to be applied to the pixels (pixel electrodes 11 and liquid crystal layer 7) of the nth row are supplied to each signal line 9 from the source driver 3.

Upon completion of write for the array of the pixels of the nth row terminates, the OFF-signal is input to the scanning line 15n, whereas the ON-signal is input to the next scanning line 15(n+1). All pixels are charged with voltages corresponding to data by repeating the operation. The transmissivity of the liquid crystal layer 7 disposed between the pixel electrode 11 and the opposed electrode 18 changes depending to a voltage applied across the pixel electrode 11 and the opposed electrode 18, and light emitted from the backlight 4 is therefore adjusted. As a result, images are displayed on the active matrix type liquid crystal display apparatus.

There is proposed a construction in which pixel electrodes are provided on an interlaminar insulation film so that the pixel electrodes and the signal line are formed as different layers and that the pixel electrodes overlap the signal lines (disclosed in Japanese Patent Application Laid-Open No. 63-279228). FIG. 27 is a sectional view showing a one-pixel part of an active matrix type liquid crystal display apparatus having the above-mentioned construction in which pixel electrodes overlap signal lines. FIG. 28 is a plan view of an active matrix board 24 shown in FIG. 27. In the construction, pixel electrodes 21 and signal lines 22 are formed as separate layers, and the pixel electrodes 21 are overlaid on the signal lines 22 through an interlaminar insulation film 23. Thus, it is possible to eliminate the gaps between the pixel electrodes 21 and the adjacent signal lines 22. Thus, it is possible to enlarge the area of the pixel electrodes 21 (aperture ratio) and thus reduce the power consumption of the active matrix type liquid crystal display apparatus. In FIGS. 27 and 28, reference numeral 24a denotes an insulation substrate, 25 denotes a TFT, 26 denotes a liquid crystal layer, 27 denotes an opposed electrode, 28 denotes an opposed board, 29 denotes a scanning line, 30 denotes a contact hole, 31 denotes an auxiliary capacitor electrode, and 32 denotes an auxiliary capacitor line.

However, in comparison with the construction shown in FIG. 26 in which the pixel electrode 11 is spaced at a predetermined interval from the signal line 9, the construction in which the pixel electrodes 21 overlap the signal lines 22 invites an increased capacitance Csd between the pixel electrode 21 and the signal line 22. With the increase of the capacitance Csd, the source signal causes a pixel electric potential to change easily. Eventually, there will occur display characteristic deterioration called shadowing phenomenon.

The mechanism of the shadowing phenomenon will be described below by using an equivalent circuit of the active matrix board 24 shown in FIG. 29. When a TFT 25 is turned on as a result of input of an ON-signal Vgh to a scanning line Gn, a pixel electrode P1 is supplied with a voltage Vs1 from a signal line S1.

Next, when the TFT 25 is turned off as a result of input of an OFF-signal Vgl to the scanning line Gn, a voltage Vs1' corresponding to data to be written to a pixel electrode P2 of a next stage is supplied to the signal line S1. At this time, the voltage of the pixel electrode P1 is influenced by the voltage Vs1' of the signal line S1 through the capacitance Csd1. Supposing that the voltage of the pixel electrode P1 at that time is Vp1, the voltage Vp1 is expressed as follows:

$$Vp11 = Vs1 - (Csd1(Vs1 - Vs1') + Csd2(Vs2 - Vs2'))/(Cp + Csd1 + Csd2) \quad (1)$$

where Cp is a capacitance of the pixel electrode (Cp=liquid crystal capacitance, Clc+auxiliary electrode capacitance, Ccs), Csd1 is a capacitance between the signal line S1 and the pixel electrode P1, Csd2 is a capacitance between a signal line S2 and the pixel electrode P1, Vs1 and Vs2 are voltages of the signal lines S1 and S2, respectively, in the case where the scanning line Gn of an nth row is in an ON-state, and Vs1' and Vs2' are voltages of the signal lines S1 and S2, respectively, in the case where a scanning line G(n+1) of an (n+1)th row is in an ON-state.

In a gate line inversion driving method (namely, "1H inversion driving") which is a conventional method of driving the active matrix type liquid crystal display apparatus, the polarity of the source signal is inverted every line of gates. Supposing that adjacent gradations are the same, $$Vs = Vs1 = Vs2, \; Vs' = Vs1' = Vs2' \quad (2)$$

Therefore, from the equations (1) and (2), $$Vp1 = Vs - (Csd1 + Csd2)/(Cp + Csd1 + Csd2) \cdot (Vs - Vs') \quad (3)$$

As is obvious from the above, in the 1H inversion driving, the amount of change of the pixel electric potential is proportional to (Csd1+Csd2). Therefore, with the increase of the capacitance Csd between the signal line S and the pixel electrode P, the shadowing phenomenon appears conspicuously.

A dot inversion driving method has been proposed as a driving method suppressing the change of the pixel electric potential due to the capacitance Csd between the signal line S and the pixel electrode P. In the dot inversion driving, the polarity of the source signal is inverted not only every line of the gates, but also every line of sources.

Supposing that adjacent gradations are the same in the dot inversion driving, $$Vs = Vs1 = -Vs2, \; Vs' = Vs1' = -Vs2' \quad (4)$$

From the equations (1) and (4), $$Vp1 = Vs - (Csd1 - Csd2)/(Cp + Csd1 + Csd2) \cdot (Vs - Vs') \quad (5)$$

From the above, in the dot inversion driving, the variation of the pixel electric potential is proportional to the difference between the capacitance Csd1 and the capacitance Csd2. Therefore, the dot inversion driving is much superior to the 1H inversion drive in suppressing the occurrence of the shadowing phenomenon. Thus, the dot inversion driving can improve the image quality of the liquid crystal display apparatus. In particular, by reducing the difference between the capacitances Csd1 and Csd2 in connection to the pixels adjoining in the direction in which the scanning line 29 extends, it is possible to suppress the occurrence of the shadowing phenomenon to a great extent.

However, the following new problem occurs. In general, in producing a liquid crystal display apparatuses, a photolithographic process is performed block by block. Thus, an alignment deviation occurs from block to block. This leads to the variation in the amount of overlapping between the pixel electrode P and the signal line S and hence the variation in the capacitance Csd between the signal line S and the pixel electrode P. In the case where the dot inversion driving is adopted, the pixel electric potential is liable to change due to the variation in the capacitance Csd. This results in difference of transmissivity among the blocks.

For example, referring to FIG. 30, let it be supposed that an alignment deviation dx has occurred in the photolithographic process of the pixel electrodes P. In this case, there is an increase in the amount of overlapping between the pixel electrode P and the signal line S1. Thus, there is an increase in the capacitance Csd1 between the signal line S1 and the pixel electrode P, whereas there is a decrease in the capacitance Csd2 between the signal line S2 and the pixel electrode P. FIG. 31 shows the relationship between the alignment deviation dx in the photolithographic process and the capacitances Csd1, Csd2. FIG. 31 indicates that with the increase of the alignment deviation dx, the difference between the capacitance Csd1 and the capacitance Csd2 becomes big, and the amount of variation of the pixel electric potential increases.

In the ordinary conventional photolithographic process, the surface of the active matrix board is exposed in blocks. This is the reason why, if a deviation dx occurs in the alignment, the amount of overlap of the pixel electrode on the signal line differs from block to block and the transmissivity differs among the blocks of the active matrix type liquid crystal display apparatus. FIG. 32 shows the relationship between the alignment deviation dx and the difference ΔT in transmissivity between a block having the alignment deviation dx and a block having no alignment deviation.

As is obvious, if the active matrix type liquid crystal display apparatus in which the pixel electrodes overlap the signal lines is driven by the dot inversion driving method, the amount of change in pixel electric potential caused by the coupling capacitances Csd really decreases, but differs largely among the photo-blocks. Consequently, there rises a big difference in the transmissivity among the blocks, leading to a problem called "block separation". As the size of the active matrix type liquid crystal display apparatus becomes larger, the number of blocks tends to increase more and more in the photolithographic process. Thus, there is a growing demand for suppression of the occurrence of the "block separation" caused by the coupling capacitance Csd.

SUMMARY OF THE INVENTION

Therefore, it is an object of the present invention to provide an active matrix type liquid crystal display apparatus capable of preventing the image quality from deterioration due to a coupling capacitance between a signal line and a pixel electrode as well as suppressing the "block separation" due to variations in the coupling capacitance.

In order to accomplish the above object, there is provided, according to an aspect of the present invention, an active matrix type liquid crystal display apparatus comprising:

an insulation substrate;

scanning lines formed on the insulation substrate;

signal lines extending in a direction intersecting a direction in which the scanning lines extend;

switching devices provided in the vicinity of each intersection of the scanning and signal lines such that the switching devices are arrayed in a matrix form;

an interlaminar insulation film disposed on or above the scanning lines, the signal lines, and the switching devices; and pixel electrodes formed on the interlaminar insulation film and arranged in a matrix form, each electrode being connected to an output terminal of an associated switching device, wherein only a part of each of opposite side portions of one pixel electrode widthwise covers two signal lines extending adjacent to the pixel electrode.

With the above arrangement, the two signal lines adjacent to one pixel electrode are widthwise covered only by a part of each side portion extending along the signal lines of the pixel electrode. Accordingly, there is no great change in the difference between a first capacitance between the pixel electrode and one of the two signal lines and a second capacitance between the pixel electrode and the other signal line even though there is a misalignment between layers. As a result, the so-called "block separation" is suppressed, which would otherwise occur in a production process step in which photolithography is performed block by block.

In one embodiment, each pixel electrode covers the associated switching device. In the construction, it is possible to form the pixel electrode almost rectangularly, which leads to an increase in the area of the pixel electrode. Thus, the power consumption can be suppressed.

In one embodiment, each signal line is bent twice between two adjacent scanning lines such that two generally parallel but longitudinally displaced parts are formed, and these two parts are covered by opposed side portions of two adjacent pixel electrodes.

With this arrangement, the pixel electrodes can be formed in a rectangular shape. Thus, it is easy to form a color filter and/or a black matrix to be disposed on an opposed board confronting the insulation substrate, wherein the color filter may have a configuration similar to that of the pixel electrode and the black matrix may be formed so as to span a gap between two adjacent pixel electrodes.

In another embodiment, the parts of the pixel electrode covering the two signal lines adjacent to the pixel electrode are parts that overhang from side edges of the pixel electrode.

With the arrangement, the signal lines can be straight, and not bent, resulting in the reduced length of the signal line. This eventually prevents the delay of a source signal and/or the breaking or discontinuity of the signal line in a large active matrix type liquid crystal display apparatus having a size more than 15 inches.

Both side edges of each pixel electrode may be bent twice such that the overhanging parts are diagonally formed on the respective sides of the pixel electrode and these overhanging parts cover the two signal lines adjacent to the pixel electrode.

Each switching device may be disposed in the vicinity of a gap between two adjacent pixel electrodes. The gap between the two adjacent pixel electrodes and the vicinity thereof are regions that essentially should be shielded from light. Accordingly, it is unnecessary to dispose a black matrix dedicated to the switching elements. Thus, it is possible to prevent the increase of the area of the black matrix. Therefore, it is possible to obtain a large aperture ratio.

In one embodiment, the active matrix type liquid crystal display apparatus of this invention comprises an opposed board having a black matrix, and the black matrix is located between two adjacent pixel electrodes in such a manner that the black matrix overlaps each one of these pixel electrodes by at least an amount corresponding to an alignment margin of the opposed board relative to the insulation board.

In this case, positions of both side edges of the black matrix to be disposed on the opposed board are set taking the alignment margin between the opposed board and the insulation substrate into consideration. Accordingly, even though there is a misalignment between both substrates, the gap between the adjacent pixel electrodes is surely shielded from light and thus the occurrence of the so-called "block separation" is suppressed to a higher extent.

In a location where the signal line is covered by the pixel electrode, an edge of the black matrix may be disposed along a center line of the pixel electrode or on an inner side of the pixel electrode than the center line.

A light shield film may be provided on the insulation substrate in such a manner that the light shield film spans a gap between the adjacent pixel electrodes.

Generally, the accuracy of alignment between the insulation substrate formed with the pixel electrodes and the opposed board confronting the insulation substrate is about ±5 $\mu$m, whereas the accuracy of alignment between layers on the insulation substrate is less than ±1 $\mu$m. Thus, the width of the light shield film is allowed to be smaller than that of the black matrix which would be disposed on the opposed board so as to span the gap between the adjacent pixel electrodes if no such light shield film was provided on the insulation substrate. In addition, it is not necessary any more to dispose on the opposed board a black matrix spanning the gap between the pixel electrodes. Consequently, the aperture ratio will be increased. Furthermore, because the total area of the black matrix disposed on the opposed board is reduced, it is possible to widen the bonding margin between the insulation substrate and the opposed board.

According to another aspect of the present invention, there is provided an active matrix type liquid crystal display apparatus comprising:

an insulation substrate;

scanning lines formed on the insulation substrate, auxiliary capacitor lines arranged parallel to the scanning lines;

signal lines extending in a direction intersecting a direction in which the scanning lines extend;

switching devices provided in the vicinity of each intersection of the scanning and signal lines such that the switching devices are arrayed in a matrix form;

an interlaminar insulation film disposed on or above the scanning lines, auxiliary capacitor lines, the signal lines, and the switching devices; and pixel electrodes formed on the interlaminar insulation film and arranged in a matrix form, each electrode being connected to an output terminal of the associated switching device, wherein both side edges of each pixel electrode are bent twice such that the overhanging parts are formed on the respective sides of the pixel electrode and these overhanging parts cover two signal lines adjacent to the pixel electrode, and wherein the auxiliary capacitor line underlies a portion between the two bents of each side edge of the pixel electrode.

With the above arrangement, the signal lines adjacent to the pixel electrode are widthwise covered by the respective overhanging parts of the pixel electrode. Therefore, a difference between a first capacitance between the pixel electrode and one of the two adjacent signal lines and a second capacitance between the pixel electrode and the other adjacent signal line is reduced. Thus, the shadowing phenomenon can be considerably suppressed by performing the dot inversion driving scheme.

The auxiliary capacitor line underlies the portion (referred to also as a "bent portion") between the two bents of each side edge of the pixel electrode. Thus, the capacitance between the signal line and the pixel electrode at its bent portion is reduced. Consequently, the change in the coupling capacitance between the pixel electrode at the bent portion and the signal line due to a misalignment between layers is considerably reduced. Accordingly, it is possible to suppress the occurrence of the "block separation", which otherwise would occur in performing a lithographic process from block to block.

The auxiliary capacitor line may include electrode portions that extend toward a portion between the two bents of each side edge of the pixel electrode such that the electrode portions underlie the portions between the two bents of each side edge of the pixel electrode. In this case, the auxiliary capacitor line proper, namely a portion running parallel to the scanning lines of the auxiliary capacitor line can be located in any desired positions relative to the longitudinal direction of the pixel electrode.

A light shield film may be provided on the insulation substrate in such a manner that the light shield film spans a gap between the adjacent pixel electrodes.

In one embodiment, the light shield film is electrically connected to either the auxiliary capacitor line or the scanning line. In this case, owing to the field shield effect of the light shield film, a part of a line of electric force emitted from the signal line terminates at the auxiliary capacitor line or the scanning line. Thus, a first capacitance between the pixel electrode and one of the two adjacent signal lines and a second capacitance between the pixel electrode and the other adjacent signal line are reduced. As a result, the shadowing phenomenon due to the difference between the first and second capacitances is further suppressed, and the "block separation" is well prevented from occurrence.

Instead of bending both side edges of each pixel electrode, each signal line may be bent. In this case, the signal line is bent twice between two adjacent scanning lines such that two generally parallel but longitudinally displaced parts are formed, and these two parts are covered by opposed side portions of two adjacent pixel electrodes, and the auxiliary capacitor line is located in a position corresponding to the portion between the two bents of the signal line. Similar effects can be achieved also in this case.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and therein.

DETAILED DESCRIPTION OF THE PREFERRED EMBODIMENTS

<First Embodiment>

Figure 1:
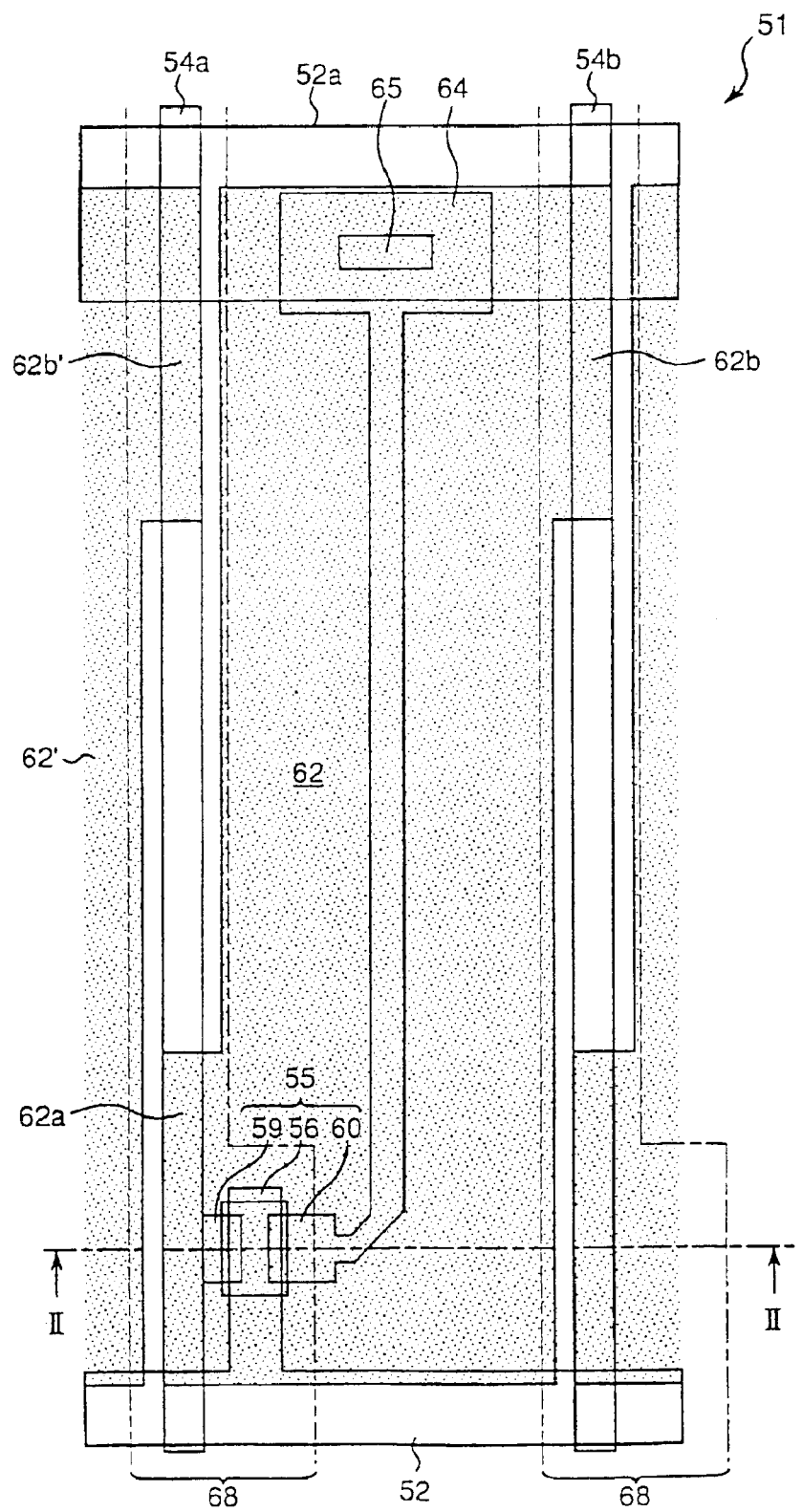
FIG. 1 is a plan view of an active matrix board in a first embodiment of the active matrix type liquid crystal display apparatus according to the present invention.
Figures 2, 3:
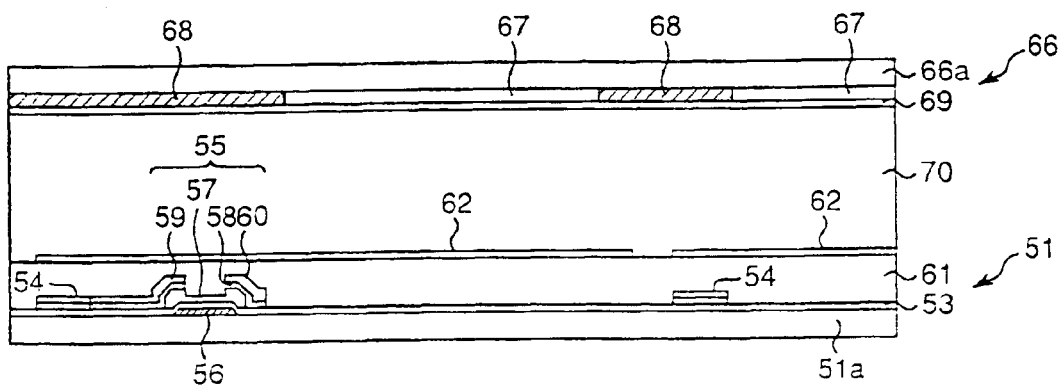
FIG. 2 is a sectional view taken along line II—II of FIG. 1.
FIG. 3 shows deviations in photo-alignment and amounts of change of coupling capacitances.

FIG. 1 is a plan view of an active matrix board 51 of an active matrix type liquid crystal display apparatus (hereinafter referred to as simply an LCD apparatus) according to the first embodiment of the present invention. FIG. 2 is a sectional view taken along line II—II of FIG. 1.

The active matrix board 51 has the following construction. As shown in FIGS. 1 and 2, a plurality (only two are shown) of gate lines (scanning lines) 52 made of metal such as Al, Ta are disposed parallel with one another on an insulation substrate 51a made of glass. The film thickness of the gate line 52 is in the range of 2000 Å–5000 Å. Above the gate lines 52 a plurality (only two are shown) of source lines (signal lines) 54 made of metal such as Al, Ta are disposed perpendicular to the gate lines 52, with a gate insulation film 53 made of SiNx or the like disposed between the gate lines 52 and the source lines 54. The film thickness of the gate insulation film 53 is in the range of 2000 Å–4000 Å. The dielectric constant of the gate insulation film 53 is three to eight. The film thickness of the source line 54 is in the range of 1000 Å–5000 Å.

Amorphous silicon TFTs 55 (only one of which is shown) are disposed in the neighborhood of the intersections of the gate lines 52 and the source lines 54. Each amorphous silicon TFT 55 is composed by a gate electrode 56, the gate insulation film 53, an amorphous semiconductor layer 57, an impurity-added semiconductor layer 58, a source electrode 59, and a drain electrode 60. The gate electrode 56 and the gate line 52 are made of the same material. The source electrode 59, the drain electrode 60, and the source line 54 are made of the same material. The amorphous semiconductor layer 57 is made of amorphous silicon formed by CVD (chemical vapor deposition). The film thickness of the amorphous semiconductor layer 57 is in the range of 500 Å–2000 Å. The gate electrode 56 is connected to the gate line 52 adjacent thereto. The source electrode 59 is connected to the source line 54 adjacent thereto.

A gate line 52a at the preceding stage overlaps a pixel electrode 62 at a current stage. On the gate insulation film 53, the drain electrode 60 extends to a position of an overlapping part of the gate line 52a to form an auxiliary capacitor electrode 64 at an end of the drain electrode 60. An interlaminar insulation film 61 is made of an organic material or an inorganic material. The film thickness of the interlaminar insulation film 61 is 1 μm to 4 μm. The dielectric constant of the interlaminar insulation film 61 is two to four. A contact hole 65 is formed in the interlaminar insulation film 61 at the position of the auxiliary capacitor electrode 64. The drain electrode 60 is connected to the pixel electrode 62 through the auxiliary capacitor electrode 64 and the contact hole 65. That is, the gate line 52a at the preceding stage is used as the auxiliary capacitor line for the pixel of the current stage.

In the embodiment, the pixel electrode 62 has a rectangular overhanging part 62a at a TFT 55-side end portion of one longitudinal side. The overhanging part 62a projects widthwise by a predetermined amount from an edge of the one longitudinal side of the pixel electrode 62. The pixel electrode 62 also has a similar rectangular overhanging part 62b at an end portion opposite from the TFT 55 of the other longitudinal side. The overhanging part 62b projects widthwise by a predetermined amount from an edge of the other longitudinal side of the pixel electrode 62. The projection amount of the overhanging part 62a and that of the overhanging part 62b are so set that the overhanging parts 62a and 62b overlap source lines 54a and 54b disposed on opposite sides of the pixel electrode 62, respectively. The length of the overhanging part 62a is equal to that of the overhanging part 62b.

The LCD apparatus has an opposed board 66 with the following construction. That is, as shown in FIG. 2, color filters 67 are formed on an insulation substrate 66a in the order of colors of red, green, and blue at a position corresponding to each pixel electrode 62. A black matrix 68 is formed between the color filters 67 and 67. The black matrix 68 serves as a patterned light shield film for preventing leak of light from the gaps between the source lines 54 and the pixel electrodes 62 as well as between the adjacent pixel electrodes. An opposed electrode 69 made of a transparent conductive material is formed over the color filters 67 and the black matrix 68.

The active matrix board 51 and the opposed board 66 are spaced at a predetermined interval, with the pixel electrodes 62 and the opposed electrode 69 opposed to each other. Then, a liquid crystal layer 70 is sandwiched between the active matrix board 51 and the opposed board 66. A sealer is applied to the resulting laminate to complete the LCD apparatus.

As described above, in the first embodiment, the rectangular overhanging parts 62a and 62b are formed at the end portions of both sides of the pixel electrode 62. The overhang amount of the overhanging part 62a and that of the overhanging part 62b are so set that the overhanging parts 62a and 62b overlap the source lines 54a and 54b adjacent to the pixel electrode 62, respectively. The length of the overhanging part 62a is equal to that of the overhanging part 62b. Also, the length of each of the overhanging parts 62a and 62b is set such that capacitances generated between the pixel electrode 62 and each of the source lines 54a, 54b in a region not covered by the pixel electrode 62 are small enough to be ignored.

In the above arrangement, the source lines 54a and 54b are mostly or entirely covered with the overhanging parts 62a and 62, respectively. Therefore, even though some alignment deviation occurs between blocks during the photolithographic process, the capacitance Csd1 between the pixel electrode 62 and the source line 54a and the capacitance Csd2 between the pixel electrode 62 and the source line 54b hardly change. Thus, the difference in transmissivity between the blocks becomes smaller.

From the above reason, it follows that the value of (Csd1−Csd2) of the equation (5) is almost constant in all blocks. Thus, it is possible to prevent the "block separation" from occurring. FIG. 3 shows deviations in photo-alignment and amounts of change of coupling capacitances in the LCD apparatus of the embodiment and the conventional LCD apparatus shown in FIGS. 27 and 28. As is obvious from FIG. 3, the amount of change of (Csd1−Csd2) is lowered by adopting the arrangement in which parts 62a and 62b of the pixel electrode 62 at both sides overhang the source lines 54a and 54b. This is why the "block separation" due to the misalignment is suppressed.

Again, according to the first embodiment, it is possible to suppress the occurrence of the "block separation" which would be caused by the variations in the coupling capacitance Csd between the pixel electrode 62 and the source lines 54a, 54b.

<Second Embodiment>

Figure 4:
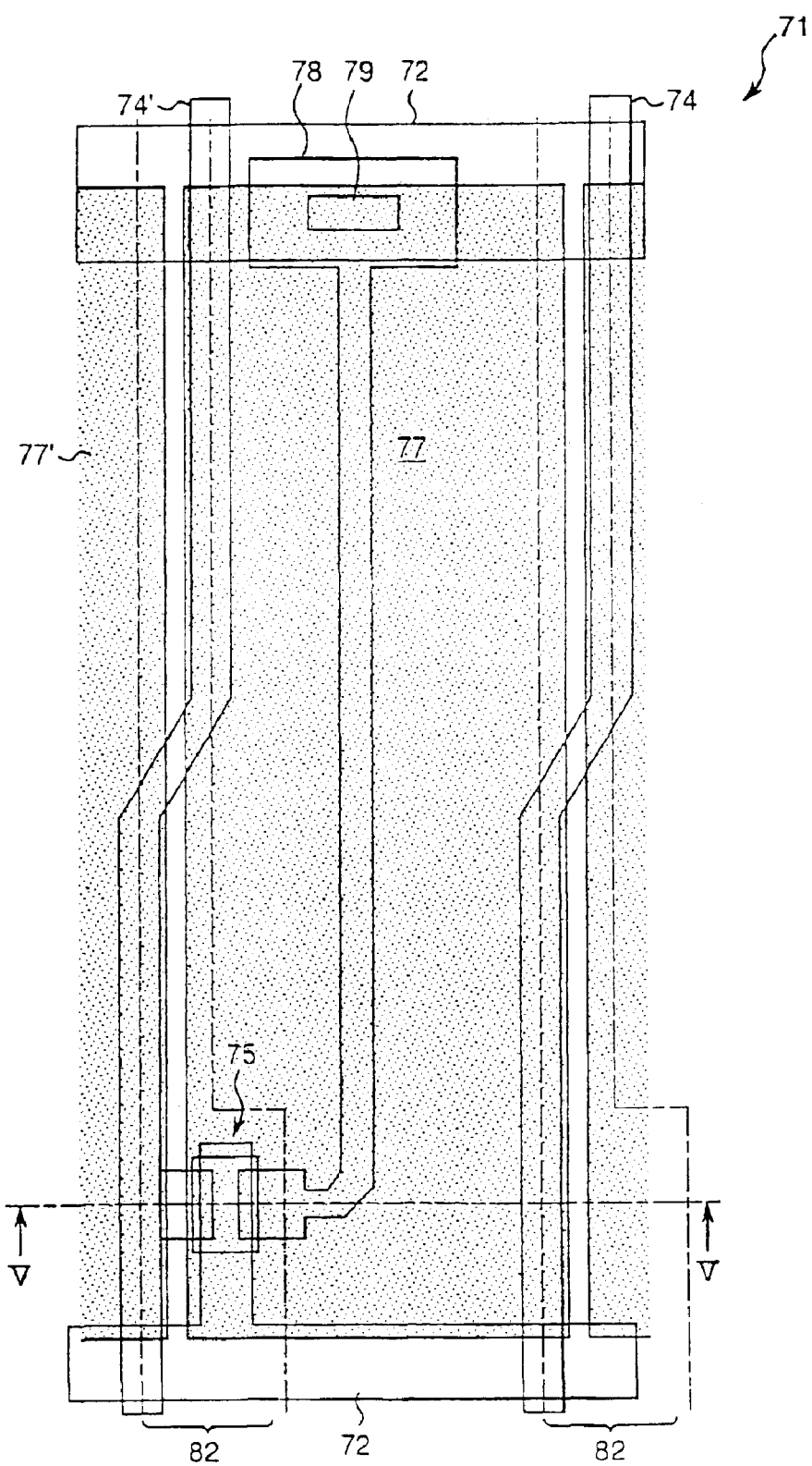
FIG. 4 is a plan view of an active matrix board in a second embodiment of the present invention.
Figure 5:
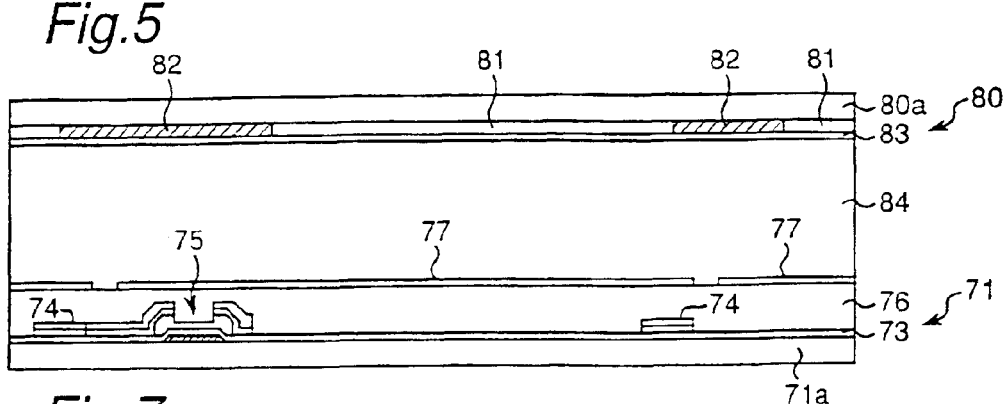
FIG. 5 is a sectional view taken along line V—V of FIG. 4.

FIG. 4 is a plan view of an active matrix board 71 of an active matrix type LCD apparatus of the second embodiment. FIG. 5 is a sectional view taken along line V—V of FIG. 4.

Referring to FIGS. 4 and 5, the active matrix board 71 has an insulation substrate 71a, gate lines 72, a gate insulation film 73, TFTs 75, an interlaminar insulation film 76, auxiliary capacitor electrodes 78, and contact holes 79 which have the same constructions and functions as the insulation substrate 51a, the gate lines 52, the gate insulation film 53, the TFTs 55, the interlaminar insulation film 61, the auxiliary capacitor electrodes 64, and the contact holes 65 of the active matrix board 51 in the first embodiment shown in FIGS. 1 and 2. Also, an opposed board 80 of the LCD apparatus of the second embodiment has an insulation substrate 80a, color filters 81, a patterned black matrix 82, and an opposed electrode 83 which are the same constructions and functions as the insulation substrate 66a, the color filters 67, the black matrix 68, and the opposed electrode 69 of the opposed board 66 of the first embodiment. Also, a liquid crystal layer 84 in the second embodiment has the same construction and function as the liquid crystal layer 70 in the first embodiment.

Pixel electrodes 77 in the second embodiment do not have parts jutting out widthwise to overhang the source lines 74, 74', but are rectangular. Instead, each source line 74, 74' is bent twice in the vicinity of a position where the pixel electrode 77 is bisected relative to the longitudinal direction into a TFT-side part and a counter-TFT-side part that is a part of the side opposite from the TFT 55. That is, each source line 74, 74' is configured to have approximately parallel but longitudinally displaced straight portions and a transition portion (referred to as "bent portion") connecting the neighboring straight portions. The TFT-side part of each pixel electrode 77 is laid over the corresponding part of the source line 74 positioned on one side (e.g., the right-hand side) of the pixel electrode 77, while the counter-TFT-side part of the pixel electrode 77 is laid over the corresponding part of the source line 74' positioned on the other side (e.g., the left-hand side) of the pixel electrode 77, with the interlaminar insulation film 76 interposed between the source lines and the pixel electrodes.

In the above arrangement, the source lines 74 and 74' located on opposite sides of one pixel electrode 77 are covered by respective lateral zones of the TFT-side and counter-TFT-side halves of the pixel electrode. Therefore, even though a misalignment occurs between blocks to some degree during the photolithographic process, the capacitances Csd1 and Csd2 hardly change. Thus, the difference in transmissivity among the blocks becomes smaller.

Figure 26:
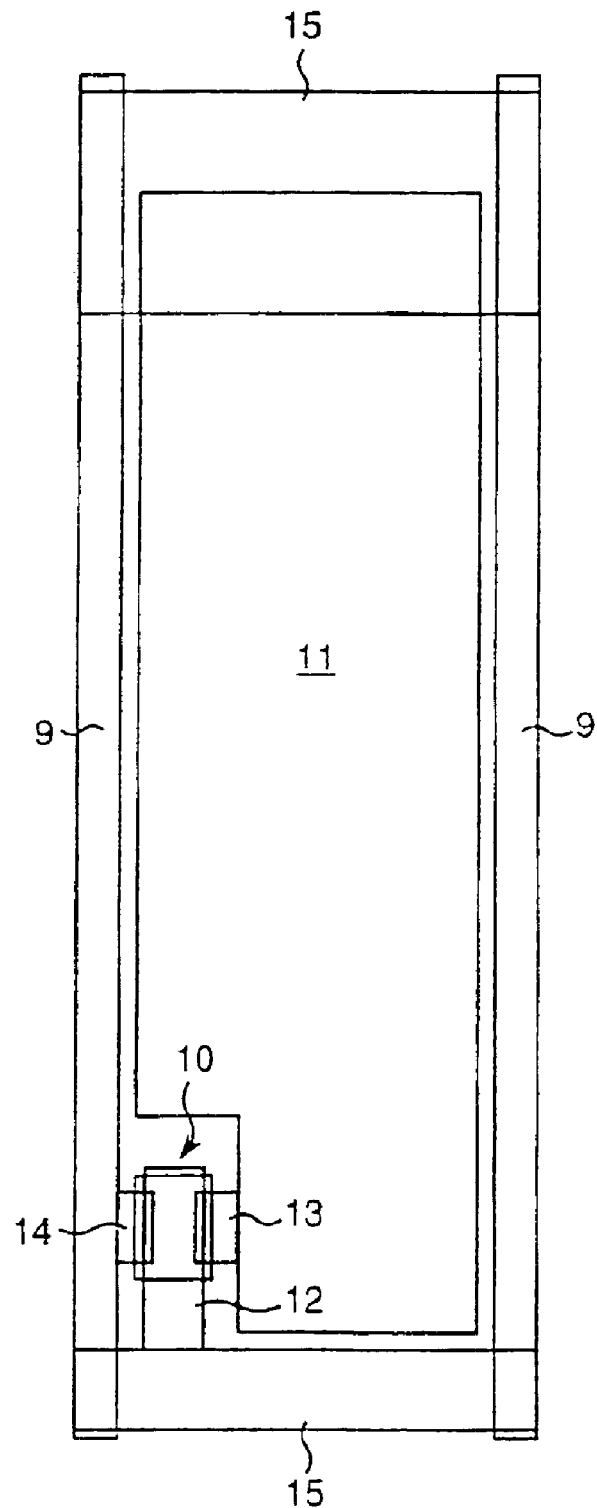
FIG. 26 is a plan view showing the one-pixel part of the active matrix type liquid crystal display apparatus shown in FIG. 24.
Figure 27:
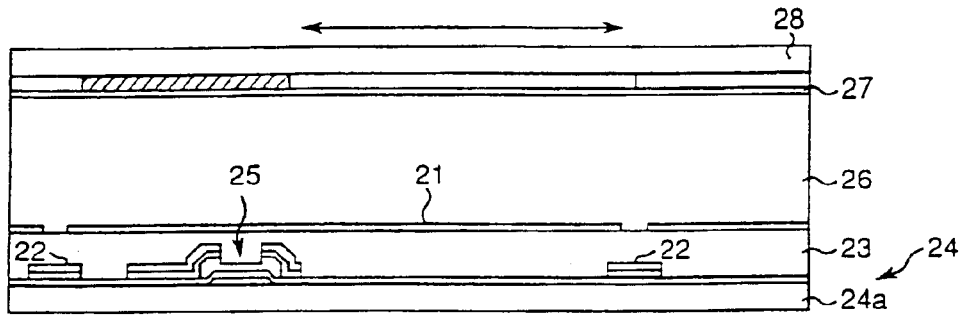
FIG. 27 is a sectional view of a conventional active matrix type liquid crystal display apparatus in which pixel electrodes overlap signal lines.

Furthermore, according to the second embodiment, the pixel electrode 77 is formed rectangularly as in the conventional active matrix type LCD apparatus shown in FIGS. 26 and 27. Therefore, the color filter 81 and the black matrix 82 can be easily formed.

<Third Embodiment>

Figure 7:
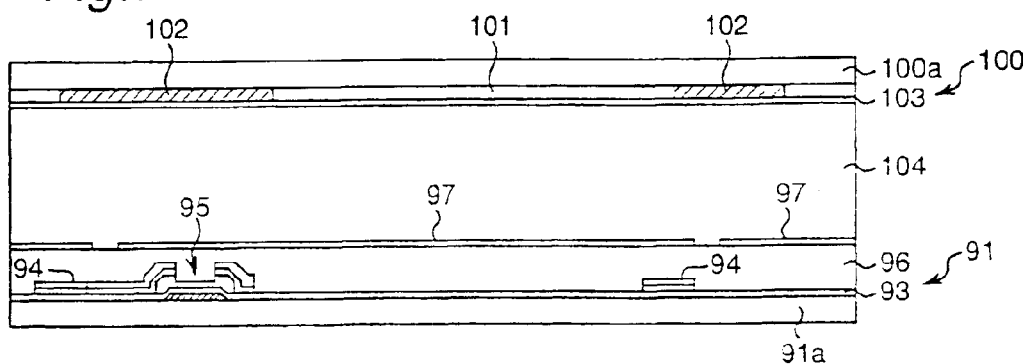
FIG. 7 is a sectional view taken along line VII—VII of FIG. 6.
Figure 6:
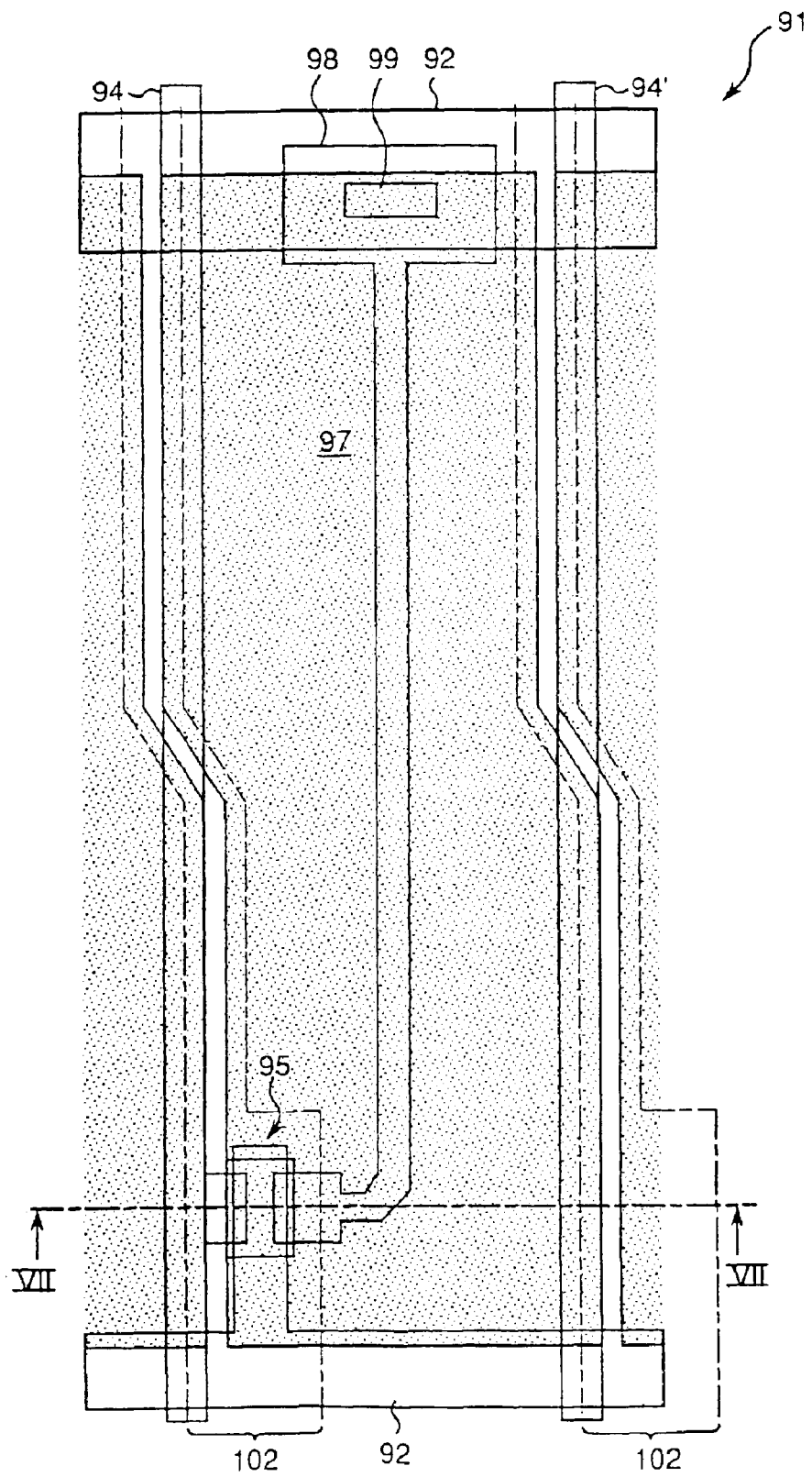
FIG. 6 is a plan view of an active matrix board in a third embodiment of the present invention.

FIG. 6 is a plan view of an active matrix board 91 in the third embodiment of the present invention. FIG. 7 is a sectional view taken along line VII—VII of FIG. 6.

Referring to FIGS. 6 and 7, the active matrix board 91 has an insulation substrate 91a, gate lines 92, a gate insulation film 93, source lines 94, 94, TFTs 95, an interlaminar insulation film 96, auxiliary capacitor electrodes 98, and contact holes 99 which have the same constructions and functions as the insulation substrate 51a, the gate lines 52, the gate insulation film 53, source lines 54, 54', the TFTs 55, the interlaminar insulation film 61, the auxiliary capacitor electrodes 64, and the contact holes 65 of the active matrix board 51 in the first embodiment shown in FIGS. 1 and 2. Also, an opposed board 100 of the LCD apparatus of the second embodiment has an insulation substrate 100a, color filters 101, a patterned black matrix 102, and an opposed electrode 103 which are the same constructions and functions as the insulation substrate 66a, the color filters 67, the black matrix 68, and the opposed electrode 69 of the opposed board 66 of the first embodiment. Also, a liquid crystal layer 104 in the third embodiment has the same construction and function as the liquid crystal layer 70 in the first embodiment.

In the third embodiment, each one of the opposite longitudinal side edges of the pixel electrode 97 is bent twice in the vicinity of a position where the pixel electrode 97 is bisected into a TFT-side part and a counter-TFT-side part in the longitudinal direction in which the source lines 94, 94' extend. As a result, the pixel electrode 97 diagonally forms overhanging parts on either side along about half the length of the pixel electrode. The TFT-side overhanging part on one side of the pixel electrode 97 is overlaid on the adjacent source line 94' through the interlaminar insulation film 96, while the counter-TFT-side overhanging part on the other side of the pixel electrode 97 is overlaid on the other adjacent source line 94 also through the interlaminar insulation film 96.

In the above arrangement, the source lines 94 and 94' located on opposite sides of one pixel electrode 97 are covered by the respective lateral overhanging parts of the pixel electrode. Therefore, even though a misalignment occurs between blocks to some degree during the photolithographic process, the capacitances Csd1 and Csd2 hardly change. Thus, the difference in transmissivity among the blocks becomes smaller.

Further, according to the third embodiment, the lateral overhanging parts of the pixel electrode 97 for covering the source lines 94 have a length almost half the length of pixel electrode 97, so that each source line is covered almost entirely in the axial direction of the source line by the adjoining overhanging parts. Accordingly, it is possible to suppress the variation of the capacitance Csd between the pixel electrode 97 and the source line 94 to a higher extent in the third embodiment than in the first embodiment in which the source lines 54a and 54b are covered with the overhanging parts 62a and 62b shorter than the half of the side edge of the pixel electrode 62, respectively. Thus, it is possible to suppress the occurrence of the "block separation" more.

Further, it is possible to increase the aperture ratio by bending the pixel electrode 97 over the source lines 94 and 94'. Particularly in a large LCD apparatus having a size of more than 15 inches, delay of a source signal and break or conduction failure of the source line raise a problem. To solve the problem, it is necessary to reduce the wiring or routing length of the source line to a possible shortest length. The source lines 94 and 94' in the third embodiment are arranged straight. Thus, it is possible to make the length of the source lines 94 and 94' shorter in the third embodiment than in the second embodiment in which the source line 74 is bent or winding in the neighborhood of each pixel electrode 77. Therefore, the third embodiment is advantageous in preventing the delay of the source signal and break of the source line.

Figure 9:
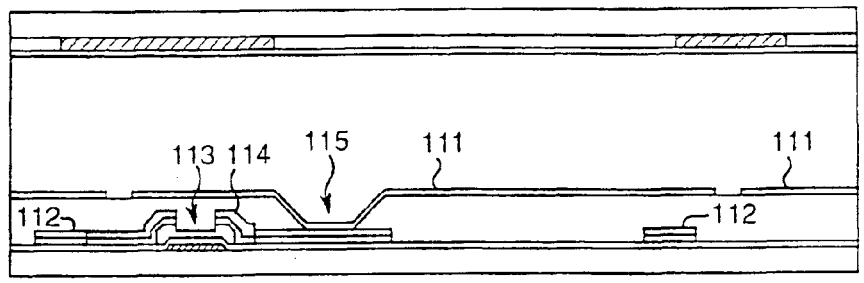
FIG. 9 is a sectional view taken along line IX—IX of FIG. 8.
Figure 8:
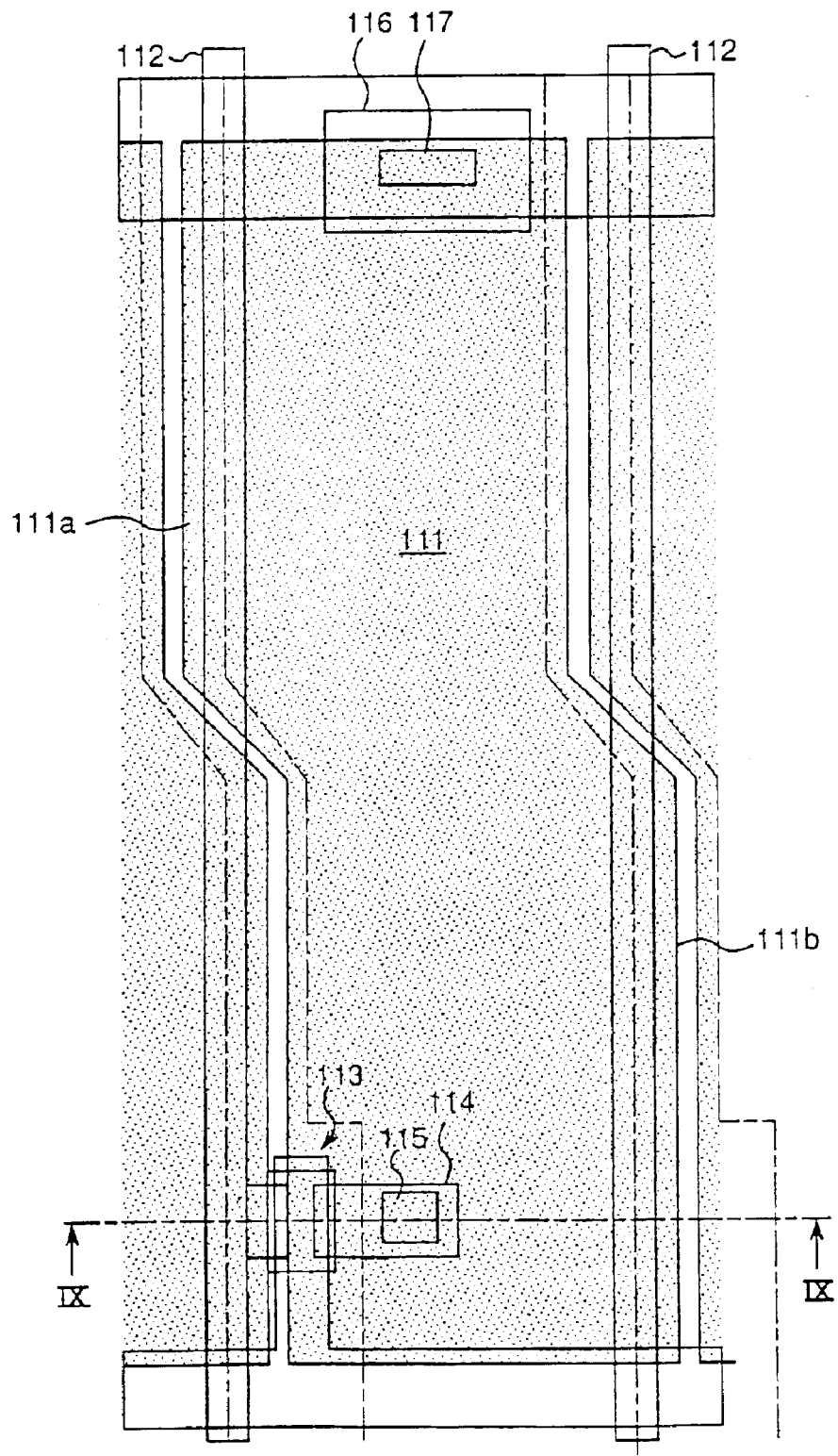
FIG. 8 is a plan view of a modification of the active matrix board shown in FIG. 6.

FIG. 8 is a plan view of a modification of the active matrix board of the third embodiment. FIG. 9 is a sectional view taken along line IV—IV of FIG. 8

In the modification, each of overhanging parts 111a and 111b of a pixel electrode 111 laterally extends beyond the source line 112 toward an adjacent pixel. This construction allows the pixel electrode 111 to sufficiently overhang the source line 112. Thus, an alignment margin in the formation of the pixel electrode becomes larger, which contributes to further suppression of the "block separation".

The pixel electrode 111 is connected to a drain electrode 114 of a TFT 113 through a contact hole 115, and an auxiliary capacitor electrode 116 is connected to the pixel electrode 111 through a contact hole 117.

<Fourth Embodiment>

Figure 11:
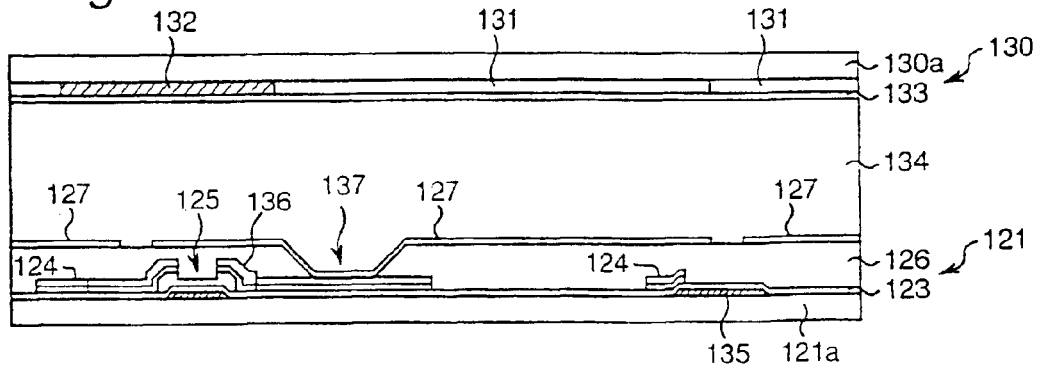
FIG. 11 is a sectional view taken along line XI—XI of FIG. 10.
Figure 10:
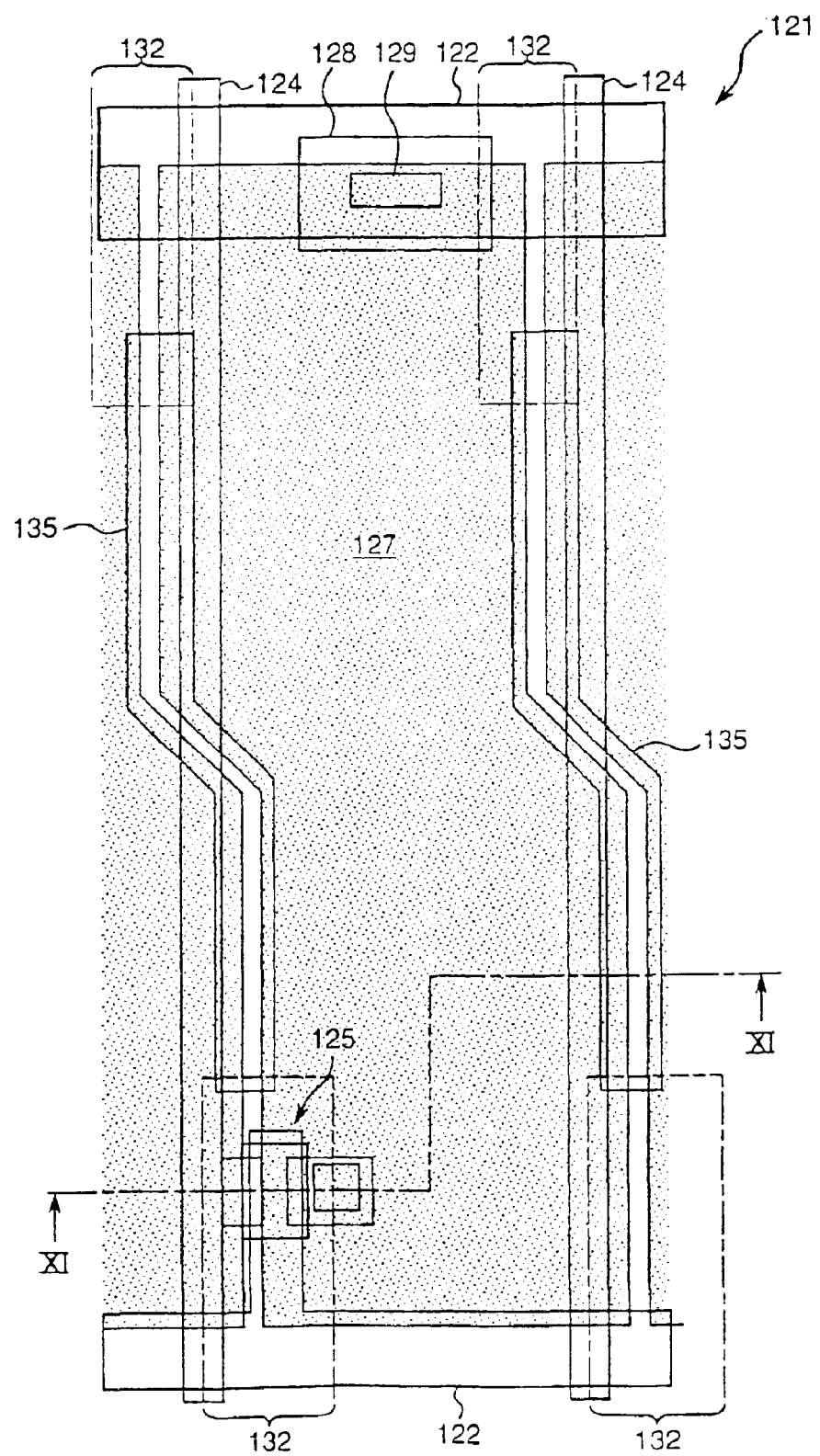
FIG. 10 is a plan view of an active matrix board in a fourth embodiment of the present invention.

FIG. 10 is a plan view of an active matrix board 121 in the fourth embodiment of the present invention. FIG. 11 is a sectional view taken along line XI—XI of FIG. 10.

Referring to FIGS. 10 and 11, the active matrix board 121 in the fourth embodiment has an insulation substrate 121a, gate lines 122, a gate insulation film 123, source lines 124, TFTs 125, an interlaminar insulation film 126, pixel electrodes 127, auxiliary capacitor electrodes 128, and contact holes 129 which have the same constructions and functions as the insulation substrate 91a, the gate lines 92, the gate insulation film 93, the source lines 94, 94', the TFTs 95, the interlaminar insulation film 96, the pixel electrodes 97, the auxiliary capacitor electrodes 98, and the contact holes 99 of the active matrix board in the third embodiment shown in FIGS. 6 and 7. Also, an opposed board 130 in the fourth embodiment has an insulation substrate 130a and an opposed electrode 133 which are the same constructions and functions as the insulation substrate 100a and the opposed electrode 103 of the opposed board 100 of the third embodiment. Also, a liquid crystal layer 134 in the fourth embodiment has the same construction and function as the liquid crystal layer 107 in the third embodiment.

In the fourth embodiment, as in the modification of the third embodiment, the pixel electrode 127 has overhanging parts which extend beyond the respective source lines 124 toward adjacent pixels, the pixel electrode 127 is connected to a drain electrode 136 of the TFT 125 through a contact hole 137, and the auxiliary capacitor electrode 128 is connected to the pixel electrode 127 through the contact hole 129.

In the fourth embodiment, a light shield film 135 made of the same material as that of the gate lines 122 is disposed in the same layer as the gate lines 122 to optically shield the gap between adjacent pixel electrodes 127 and 127. Thus, it is unnecessary to form the black matrix 132 on the opposed board 130 in such a position that the black matrix 132 confronts the gap between the adjacent pixel electrodes 127 and 127. Thus it is enough to form the black matrix 132 only in positions in which it confronts the TFTs 125.

The accuracy of the alignment between the active matrix board 121 and the opposed board 130 is generally about ±5 μm, whereas the accuracy of the alignment between the layers of the active matrix board 121 is less than ±1 μm. Thus, the light shield film 135 of the active matrix board 121 is allowed to be made smaller in width than the black matrix 132 that would be used without the light shield film 135. Also, because provision of the light shield film 135 eliminates the black matrix 132 in the corresponding locations in the opposed board, the area of the color filters 131 is increased, resulting in the improved aperture ratio.

Furthermore, because the area of the black matrix 32 disposed on the opposed board 130 is reduced, it is possible to widen the bonding margin between the active matrix board 121 and the opposed board 130.

In the fourth embodiment, the construction in which the light shield film 135 is provided and the formation of the black matrix 132 is omitted owing to the provision of the light shield film 135 has been applied to the third embodiment. This construction may be applied to the first and second embodiments.

In each of the first to fourth embodiments, the thin film transistor 55, 75, 95, 113, 125 is disposed in the vicinity of a region below the gap between the adjacent pixel electrodes 62 and 62, 77 and 77, 97 and 97, 111 and 111, 127 and 127 respectively through the interlaminar insulation film 61, 76, 96, 126. In other words, the thin film transistor 55, 75, 95, 113, 125 is disposed in the vicinity of a region corresponding to the location in which the black matrix 68, 82, 102, 132 is to be disposed in any case. Therefore, it is unnecessary to dispose a black matrix for specific use for the thin film transistors 55, 75, 95, 113, and 125. Thus, the area of the black matrix 68, 82, 102, and 132 is prevented from being increased. Therefore, it is possible to obtain a large aperture ratio.

In each of the above embodiments, the region in which the black matrix 68, 82, 102, and 132 is formed is set as follows. That is, the black matrix is formed on the opposed board such that the black matrix is opposed to the gap between two adjacent pixel electrodes. One side edge of the black matrix opposed to a source line-covering pixel electrode includes the longitudinal center line of the covered source line (in cases shown in FIGS. 4, 6, 8, and 10) or is located at the inner side (see FIG. 1) of the pixel electrode with respect to the center line of the source line. On the other hand, the other side edge of the black matrix is spaced by more than an alignment margin between the opposed board and the active matrix board from the side edge of the source line opposite from the above pixel electrode.

In this manner, the positions of both side edges of the black matrix 68, 82, 102, 132 to be included in the opposed board are set in consideration of the alignment margin between the opposed board and the active matrix board. Accordingly, even though there is a displacement between these boards, the gap between the adjacent pixel electrodes is optically shielded and thus the occurrence of the "block separation" is well suppressed.

In the embodiments shown in FIGS. 4, 6, 8, and 10, the bent portion (which is a slant portion between two bents) of the source line 74 and that of the pixel electrodes 97, 111, 127 are formed in a longitudinally central position of the pixel electrodes 77, 97, 111, and 127, respectively. But, to suppress the occurrence of the shadowing phenomenon and the "block separation", the bent portion is not necessarily provided strictly in a central position of the pixel electrode. Accordingly, in the present invention, the position of the bent portion to be formed on the pixel electrode or the source line is not limited to the longitudinally central position of each pixel electrode.

Note that the source line (signal line) may have a portion not covered by the pixel electrode in the widthwise direction of the source line so long as the uncovered portion is narrow enough not to hinder the effects of the above embodiments from being achieved.

<Fifth Embodiment>

Figure 12:
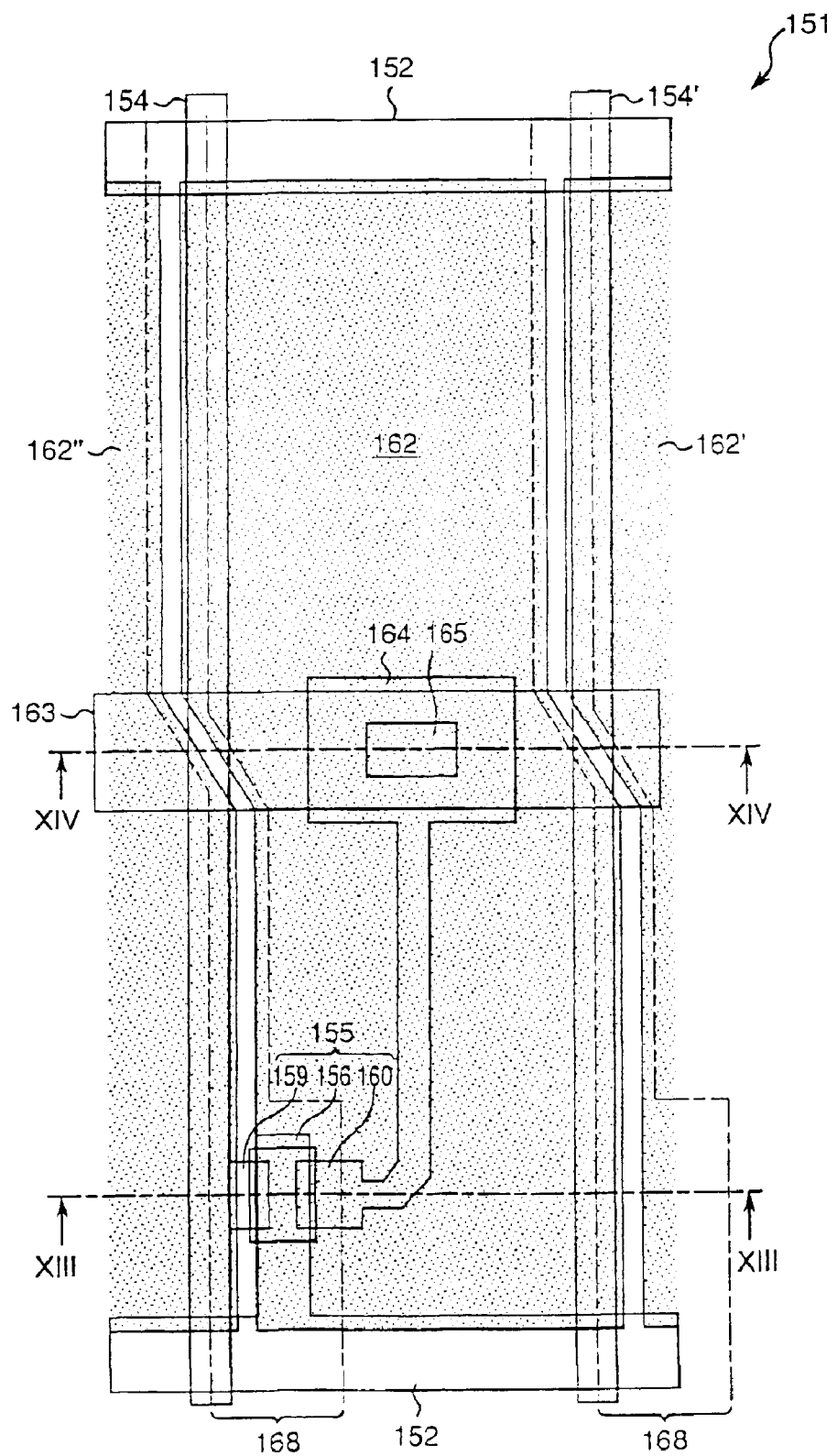
FIG. 12 is a plan view of an active matrix board in a fifth embodiment of the present invention.

FIG. 12 is a plan view of an active matrix board 151 of an active matrix type liquid crystal display apparatus (hereinafter referred to as simply an LCD apparatus) according to a fifth embodiment of the present invention.

Figure 13:
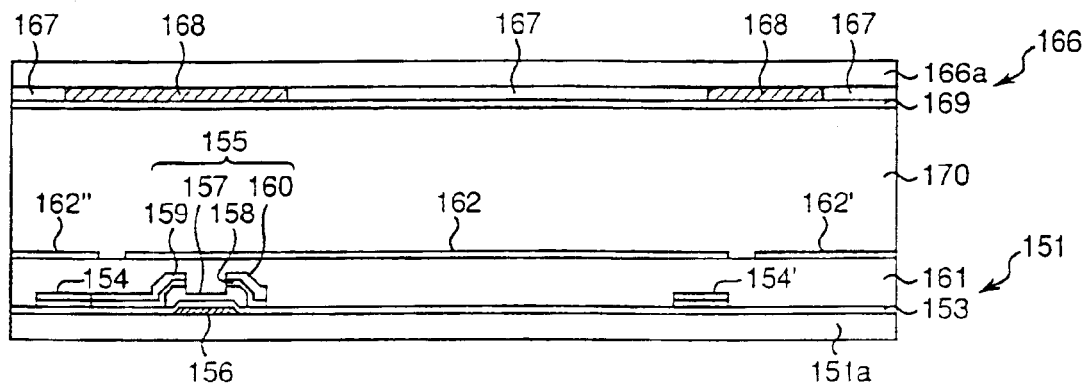
FIG. 13 is a sectional view taken along line XIII—XIII of FIG. 12.
Figure 14:
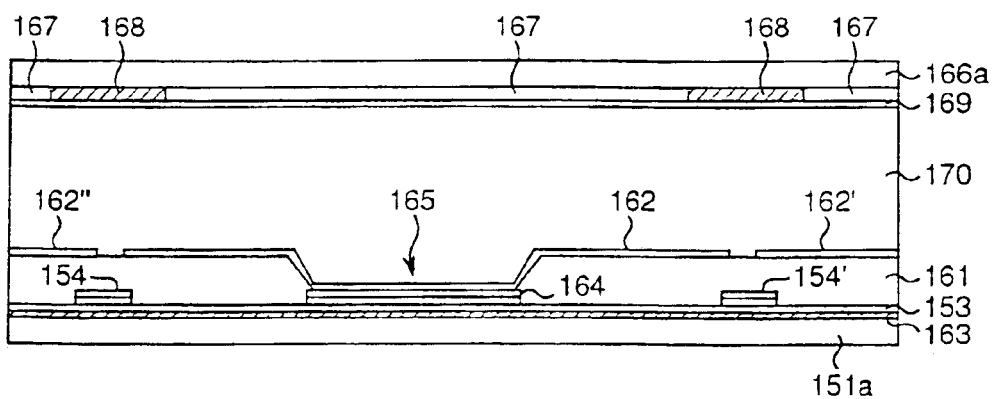
FIG. 14 is a sectional view taken along line XIV—XIV of FIG. 12.

FIG. 13 is a sectional view taken along line XIII–XIII of FIG. 12, and FIG. 14 is a sectional view taken along line XIV—XIV of FIG. 12.

The active matrix board 151 has the following construction. As shown in FIGS. 12–14, a plurality (only two are shown) of gate lines (scanning lines) 152 made of metal such as Al, Ta are disposed parallel with one another on an insulation substrate 151a made of glass. The film thickness of the gate line 152 is in the range of 2000 Å–5000 Å. Above the gate lines 152 a plurality (only two are shown) of source lines (signal lines) 154, 154' made of metal such as Al, Ta are disposed perpendicular to the gate lines 152, with a gate insulation film 153 made of SiNx or the like disposed between the gate lines 152 and the source lines 154, 154'. The film thickness of the gate insulation film 153 is in the range of 2000 Å–4000 Å. The dielectric constant of the gate insulation film 153 is three to eight. The film thickness of the source lines 154, 154' is in the range of 1000 Å–5000 Å.

Amorphous silicon TFTs 155 (only one of which is shown) are disposed in the neighborhood of the intersections of the gate lines 152 and the source lines 154, 154'. Each amorphous silicon TFT 155 is composed by a gate electrode 156, the gate insulation film 153, an amorphous semiconductor layer 157, an impurity-added semiconductor layer 158, a source electrode 159, and a drain electrode 160. The gate electrode 156 and the gate line 152 are made of the same material. The source electrode 159, the drain electrode 160, and the source line 154, 154' are made of the same material. The amorphous semiconductor layer 157 is made of amorphous silicon formed by CVD (chemical vapor deposition). The film thickness of the amorphous semiconductor layer 157 is in the range of 500 Å–2000 Å. The gate electrode 156 is connected to the gate line 152 adjacent thereto. The source electrode 159 is connected to the source line 154 adjacent thereto.

Auxiliary capacitor lines 163 (only one of which is shown) are formed in the same layer as the gate lines 152 (namely, on the insulation substrate 151*a*). On the gate insulation film 153, the drain electrode 160 extends to a position of the auxiliary capacitor line 163 to form an auxiliary capacitor electrode 164 at an end of the drain electrode 160. An interlaminar insulation film 161 is made of an organic material or an inorganic material. The film thickness of the interlaminar insulation film 161 is 1 μm to 4 μm. The dielectric constant of the interlaminar insulation film 161 is about two to four. A contact hole 165 is formed through the interlaminar insulation film 161 at the position of the auxiliary capacitor electrode 164. The drain electrode 160 is connected to the pixel electrode 162 through the contact hole 165 and the auxiliary capacitor electrode 164.

In the fifth embodiment, the auxiliary capacitor line 163 is disposed at a position where the pixel electrode 162 is bisected relative to the longitudinal direction of the pixel electrode into a TFT-side part (which is a part nearer to the TFT 155) and a counter-TFT-side part (which is a part farther from the TFT 155). That is, the center line of the auxiliary capacitor line 163 is substantially coincident to a transverse center line of the pixel electrode 162. Each pixel electrode is bent at the position of the auxiliary capacitor line 163. More specifically, each one of the opposite longitudinal side edges of the pixel electrode is bent twice in the vicinity of the transverse center line of the pixel electrode. As a result, the pixel electrode diagonally forms overhanging parts on either side along about half the length of the pixel electrode. A slant portion defined between the bents (referred to as "bent portion" below) of either side edge of the pixel electrode is placed just above the auxiliary capacitor line 163. The overhanging part in the TFT-side part of the pixel electrode 162 overhangs over the source line 154' on one side of the pixel electrode, with the interlaminar insulation film 161 disposed therebetween. The counter-TFT-side part of the pixel electrode 162 overhangs over the source line 154 on the other side of the pixel electrode, also with the interlaminar insulation film 161 disposed therebetween.

The LCD apparatus has an opposed board 166 with the following construction. That is, as shown in FIGS. 13 and 14, color filters 167 are formed on an insulation substrate 166*a* in the order of colors of red, green, and blue at a position corresponding to each pixel electrode 162, 162', 162". A black matrix 168 is formed between the color filters 167 and 167. The black matrix 168 serves as a patterned light shield film for preventing leak of light from the gaps between the adjacent pixel electrodes 162 and 162', 162 and 162". An opposed electrode 169 made of a transparent conductive material is formed over the color filters 167 and the black matrix 168.

The active matrix board 151 and the opposed board 166 are spaced at a predetermined interval, with the pixel electrodes 162, 162', 162" and the opposed electrode 169 opposed to each other. Then, a liquid crystal layer 170 is sandwiched between the active matrix board 151 and the opposed board 166. A sealer is applied to the resulting laminate to complete the LCD apparatus.

As clearly shown in FIG. 14, in the fifth embodiment, the pixel electrode 162 disposed over the auxiliary capacitor line 163 descends along a surface defining the contact hole 165 to be electrically connected to the auxiliary capacitor electrode 164 (hence, to the drain electrode 160). Paying attention to the source line 154 on the left side as viewed in FIG. 12, this source line 154 is covered by the overhanging part of the TFT-side part of the pixel electrode 162" on the left side of the source line 154 and by the overhanging part of the counter-TFT-side part of the pixel electrode 162 on the right side of the source line 154. This is also true of the source line 154' on the right side of FIG. 12.

If the auxiliary capacitor line 163 was not located in coincidence with the bent portions of the pixel electrodes 162, 162', 162", a misalignment between layers would cause great variations in the coupling capacitance Csd at the bent portions where the source lines 154, 154' are not covered with the adjacent pixel electrodes.

In contrast to this, in the fifth embodiment, the auxiliary capacitor line 163 is so disposed as if it bisects the pixel electrode 162 into the TFT 155-side part and the counter-TFT 155-side part. Accordingly, the bent portions of the side edges of the pixel electrode 162 located at the longitudinally central position of the pixel electrode are present directly above the auxiliary capacitor line 163. Because the source lines (signal lines) 154, 154' and the auxiliary capacitor line 163 form the coupling capacitances, a part of an electric line of force emitted from the source lines 154, 154' terminates at, the auxiliary capacitor line 163. Consequently, the coupling capacitance Csd between the pixel electrode 162 at the bent portion and the source line 154, 154' becomes small.

Accordingly, even though there is a misalignment between layers, there is little variation in the coupling capacitance Csd between the pixel electrode 162 and the source line 154 at the bent portion where the source line 154 is not covered with the adjacent pixel electrodes 162" and 162. Consequently, there is a great reduction of the variation amount in the coupling capacitance Csd1 between the source line 154 and the pixel electrode 162 and in the coupling capacitance Csd2 between the source line 154' and the pixel electrode 162. Thus, it is possible to suppress the occurrence of the "block separation".

That is, in the fifth embodiment, it is possible to suppress the occurrence of the "block separation" due to variations in the coupling capacitance Csd between the pixel electrode 162 and the source lines 154, 154'.

<Sixth Embodiment>

In the fifth embodiment, the auxiliary capacitor line 163 is located at the position where the pixel electrode 162 is bisected into the TFT 155 side part and the part opposite from the TFT 155. That is, the auxiliary capacitor line 163 is disposed along a transverse center line of the pixel electrode 162. But, there are cases where the auxiliary capacitor line cannot be disposed such a position to improve the aperture ratio and the yield. The sixth embodiment is intended to cope with such a case.

Figure 15:
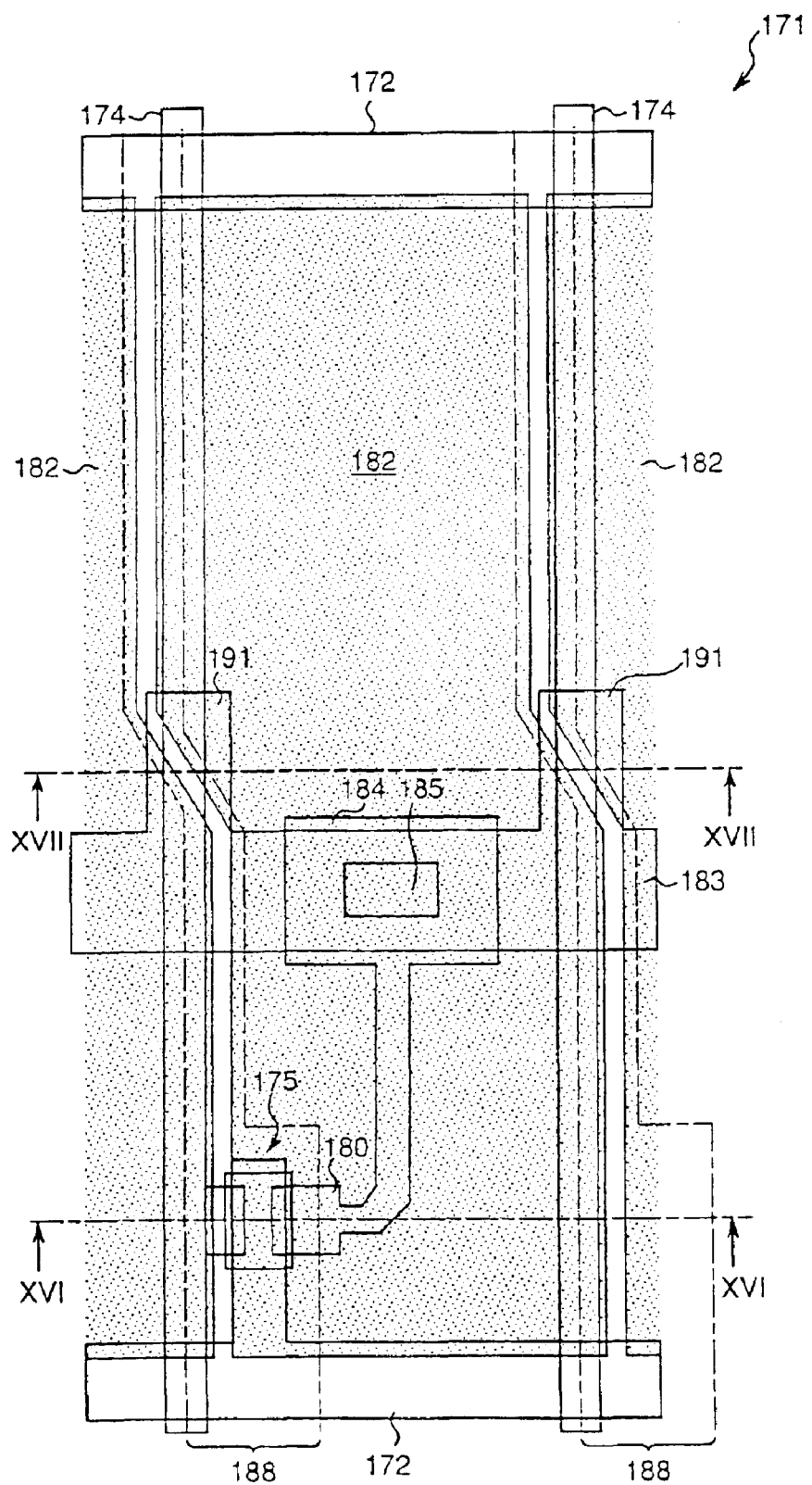
FIG. 15 is a plan view of an active matrix board in a sixth embodiment of the present invention.
Figure 16:
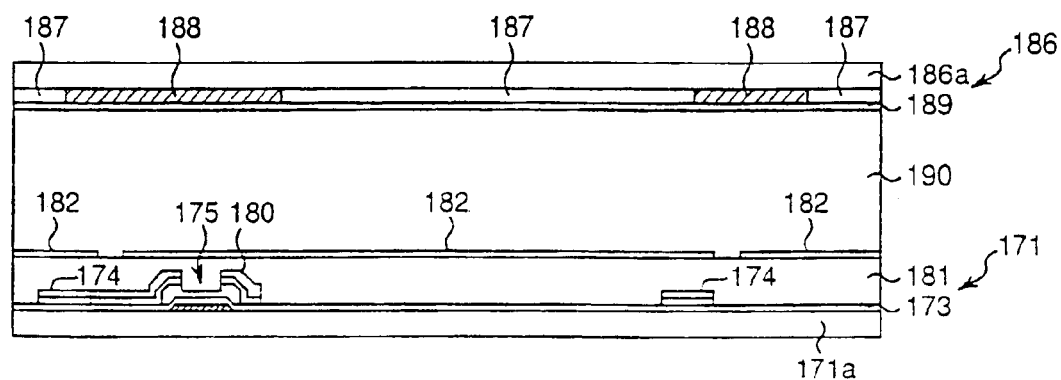
FIG. 16 is a sectional view taken along line XVI—XVI of FIG. 15.

FIG. 15 is a plan view of an active matrix board 171 of an active matrix type liquid crystal display apparatus (hereinafter referred to as simply an LCD apparatus) according to a sixth embodiment of the present invention. FIG. 16 is a sectional view taken along line XVI—XVI of FIG. 15, and FIG. 17 is a sectional view taken along line XVII—XVII of FIG. 15.

Figure 17:
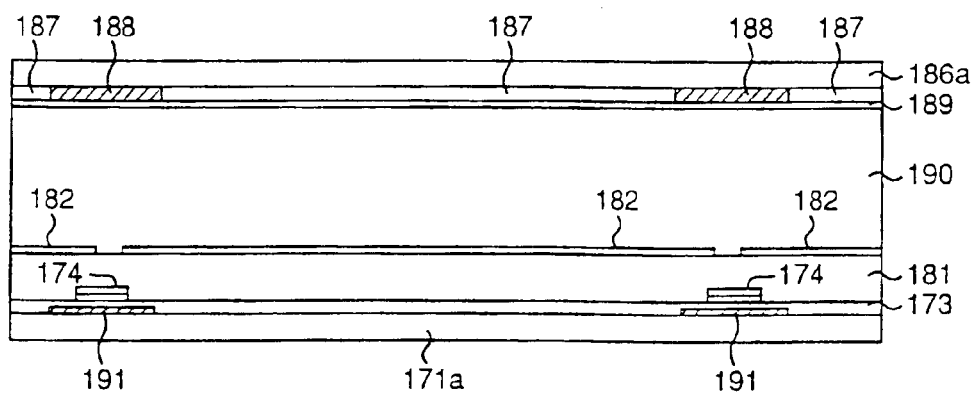
FIG. 17 is a sectional view taken along line XVII—XVII of FIG. 15.

Referring to FIGS. 15 to 17, the active matrix board 171 has an insulation substrate 171a, gate lines 172, a gate insulation film 173, source lines 174, TFTs 175, an interlaminar insulation film 181, and pixel electrodes 182 which have the same constructions and functions as the insulation substrate 151a, the gate lines 152, the gate insulation film 153, source the lines 154, 154', the TFTs 155, the interlaminar insulation film 161, and the pixel electrodes 162 of the active matrix board 151 in the fifth embodiment shown in FIGS. 12 to 14. Also, an opposed board 186 of the LCD apparatus of the sixth embodiment has an insulation substrate 186a, color filters 187, a patterned black matrix 188, and an opposed electrode 189 which are the same constructions and functions as the insulation substrate 166a, the color filters 167, the black matrix 168, and the opposed electrode 169 of the opposed board 166 of the fifth embodiment. Also, a liquid crystal layer 190 in the sixth embodiment has the same construction and function as the liquid crystal layer 170 in the fifth embodiment.

In the sixth embodiment, an auxiliary capacitor line 183 is disposed not along a transverse center line of the pixel electrode 182 but along a transverse line displaced toward the TFT 175 side with respect to the center line such that the auxiliary capacitor line 183 is parallel with the gate lines 172. A drain electrode 180 of the TFT 175 is extended to the auxiliary capacitor line 183 to form an auxiliary capacitor electrode 184 at an end of the drain electrode 180. The auxiliary capacitor electrode 184 is connected to the pixel electrode 182 at the position of the contact hole 185.

The auxiliary capacitor line 183 is provided with electrode portions 191 that extend along the underside of each source line 174 to a central portion of the pixel electrode 182. In this manner, as shown in FIG. 15, the bent portions of the side edges of the pixel electrode 182, which are formed at the position where the side edges are bisected, are positioned above the electrode portions 191 whose electric potentials are equal to the electric potential of the auxiliary capacitor line 183.

Therefore, though the auxiliary capacitor line 183 is not disposed in the middle of the pixel electrode 182, the LCD apparatus of the sixth embodiment is able to function similarly to the LCD apparatus in which the bent portions of the pixel electrode 182 are present directly above the auxiliary capacitor line 183. That is, the source line 174 at the bent portion and the electrode portion 191 form the coupling capacitance. Consequently, the coupling capacitance Csd between the pixel electrode 182 at the bent portion and the source line 174 is reduced.

If the pixel electrode 182 is bent over the auxiliary capacitor line 183, it follows that the bent portion will not be located in the middle of the pixel electrode 182. The result is that Csd1≠Csd2 and that the value of (Csd1−Csd2) in the equation (5) above becomes large. Thus, even if the dot inversion driving method is adopted, the shadowing phenomenon is likely to occur due to the coupling capacitance Csd between the pixel electrode 182 and the source line 174.

<Seventh Embodiment>

Figure 18:
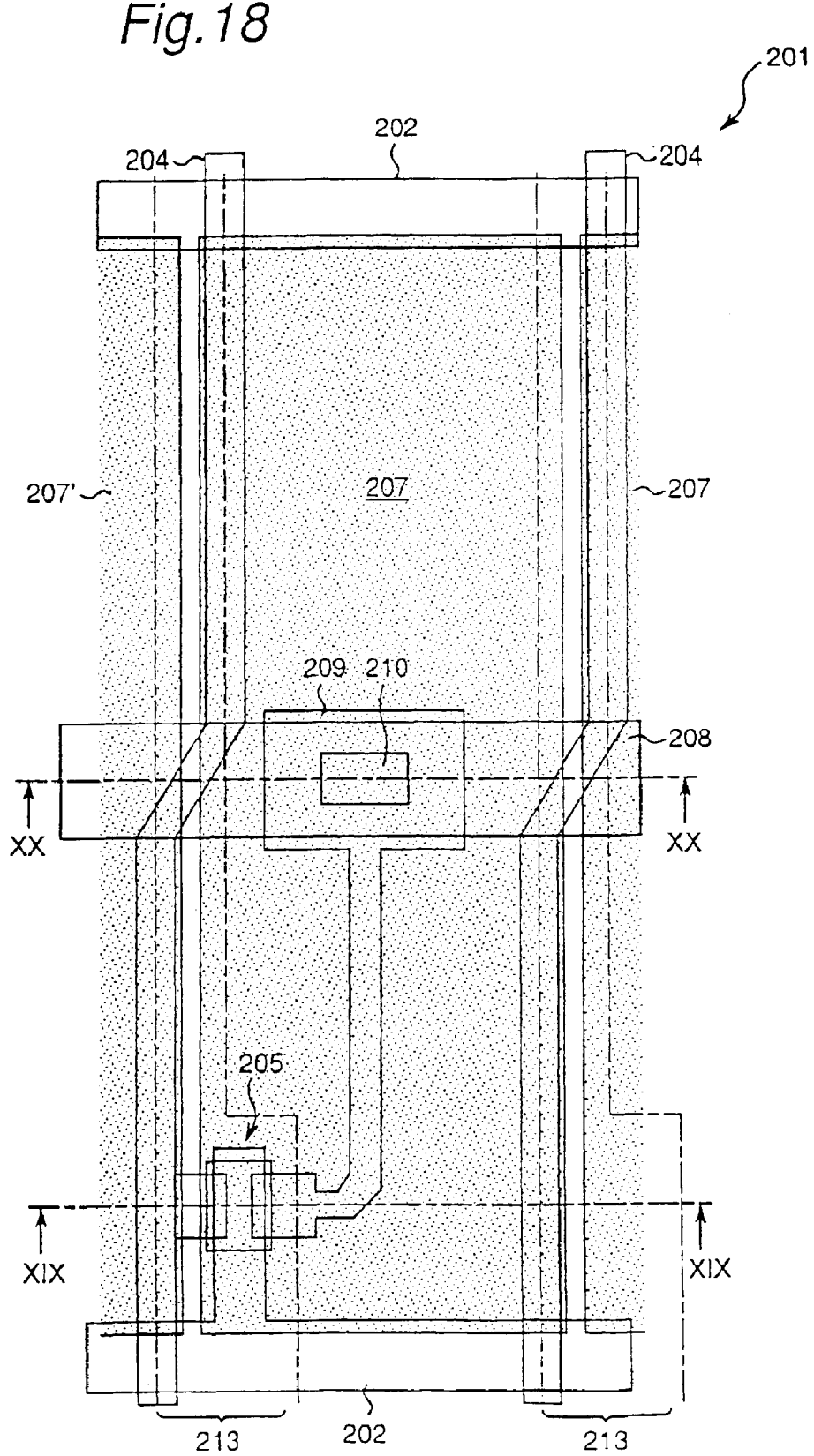
FIG. 18 is a plan view of an active matrix board in a seventh embodiment of the present invention.
Figure 19:
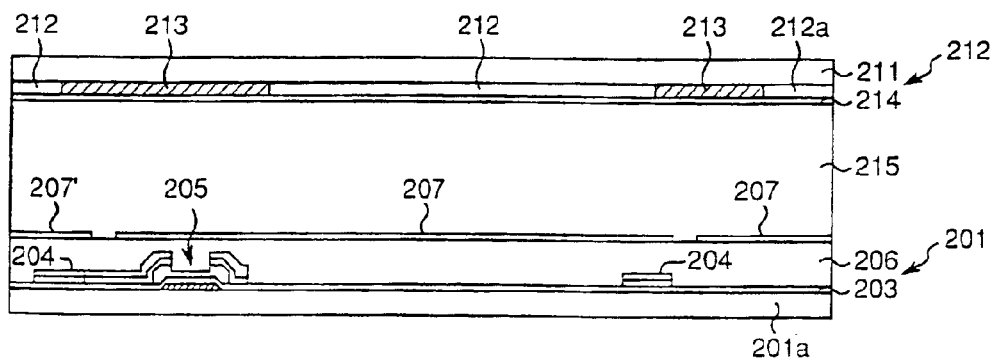
FIG. 19 is a sectional view taken along line XIX—XIX of FIG. 18.

FIG. 18 is a plan view of an active matrix board 201 of an active matrix type liquid crystal display apparatus (hereinafter referred to as simply an LCD apparatus) according to a seventh embodiment of the present invention. FIG. 19 is a sectional view taken along line XIX—XIX of FIG. 18, and FIG. 20 is a sectional view taken along line XX—XX of FIG. 18.

Figure 20:
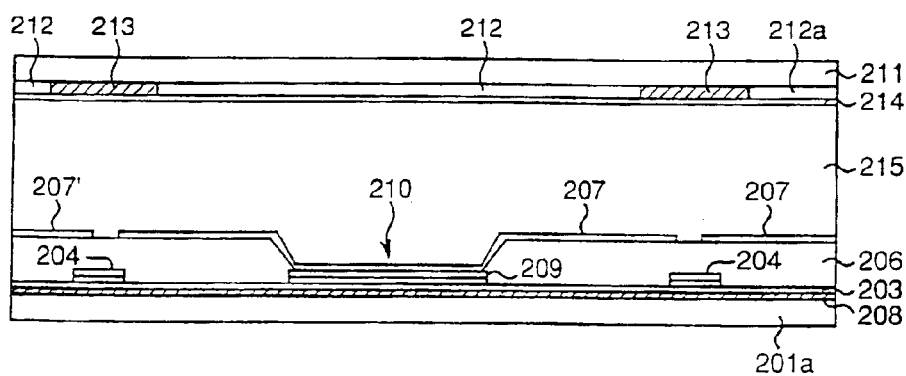
FIG. 20 is a sectional view taken along line XX—XX of FIG. 18.

Referring to FIGS. 18 to 20, the active matrix board 201 has an insulation substrate 201a, gate lines 202, a gate insulation film 203, TFTs 205, an interlaminar insulation film 206, auxiliary capacitor lines 208, auxiliary capacitor electrodes 209, and contact holes 210 which have the same constructions and functions as the insulation substrate 151a, the gate lines 152, the gate insulation film 153, the TFTs 155, the interlaminar insulation film 161, the auxiliary capacitor lines 163, the auxiliary capacitor electrodes 164, and the contact holes 165 of the active matrix board 151 in the fifth embodiment shown in FIGS. 12 to 14. Also, an opposed board 211 of the LCD apparatus of the seventh embodiment has an insulation substrate 211a, color filters 212, a patterned black matrix 213, and an opposed electrode 214 which are the same constructions and functions as the insulation substrate 166a, the color filters 167, the black matrix 168, and the opposed electrode 169 of the opposed board 166 of the fifth embodiment. Also, a liquid crystal layer 215 in the seventh embodiment has the same construction and function as the liquid crystal layer 170 in the fifth embodiment.

Unlike the fifth embodiment, both side edges of each pixel electrode 207 in the seventh embodiment are not bent but straight. Thus, the pixel electrode 207 is rectangular in shape. Instead, each source line 204 is bent at the position of the auxiliary capacitor line 208 that is located at a position where the pixel electrode 207 is bisected into a TFT 205-side part and a counter-TFT 205-side part which is a part opposite from the TFT 205. The TFT-side part of each pixel electrode 207 is laid over the corresponding part of the source line 204 positioned on one side (e.g., the right-hand side) of the pixel electrode 207, while the counter-TFT-side part of the pixel electrode 207 is laid over the corresponding part of the source line 204 positioned on the other side (e.g., the left-hand side) of the pixel electrode 207, with the interlaminar insulation film 206 interposed between the source lines and the pixel electrodes.

That is, in the seventh embodiment, unlike the fifth embodiment in which both side edges of the pixel electrode are bent, the source line 204 is bent. By thus doing, it is possible to reduce the coupling capacitance Csd between the pixel electrode 207 and the source line 204 at the bent portion, similarly to the fifth embodiment. Accordingly, it is possible to suppress the occurrence of the "block separation" due to a misalignment between layers.

Figure 28:
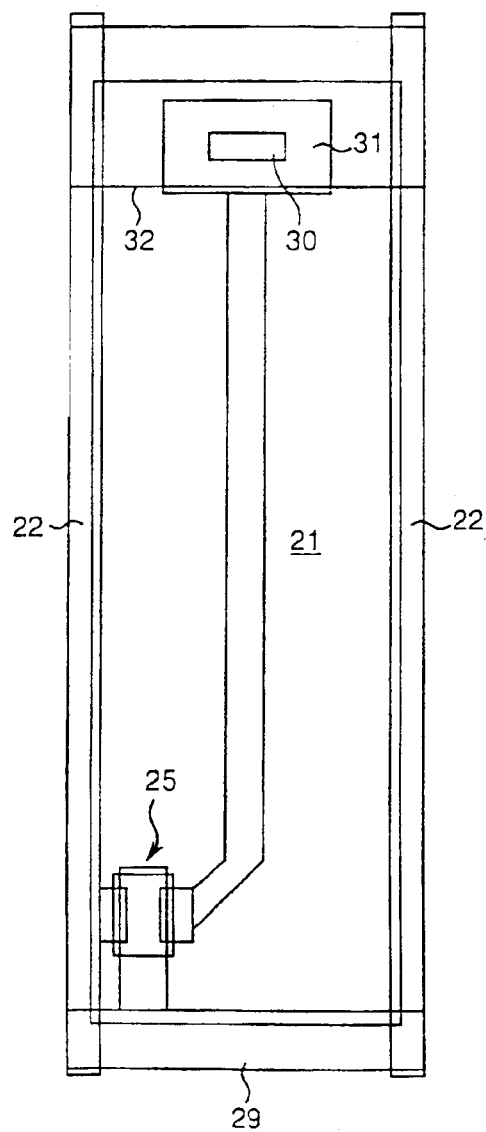
FIG. 28 is a plan view of an active matrix board shown in FIG. 27.
Figure 29:
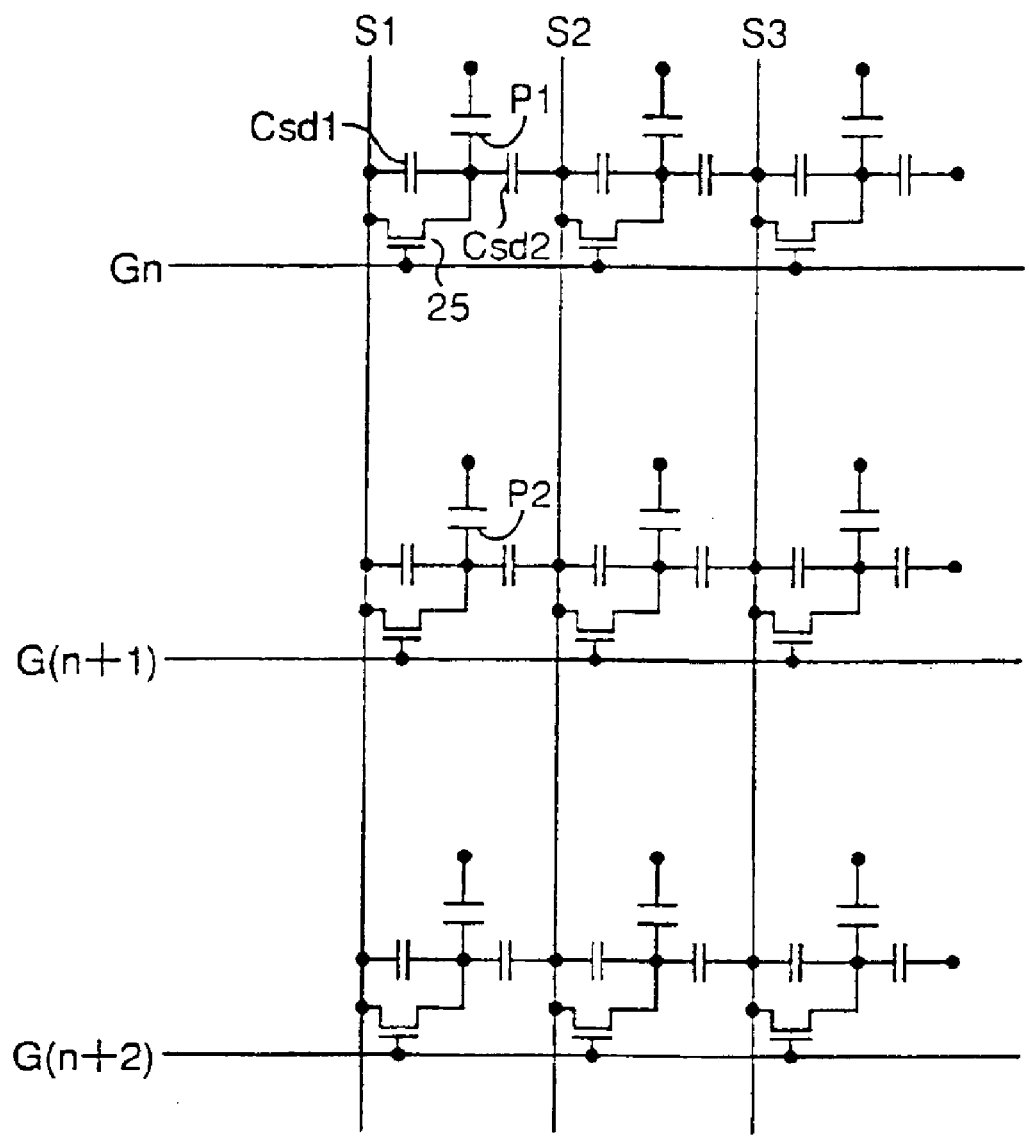
FIG. 29 shows an equivalent circuit of the active matrix board shown in FIG. 28.
Figure 30:
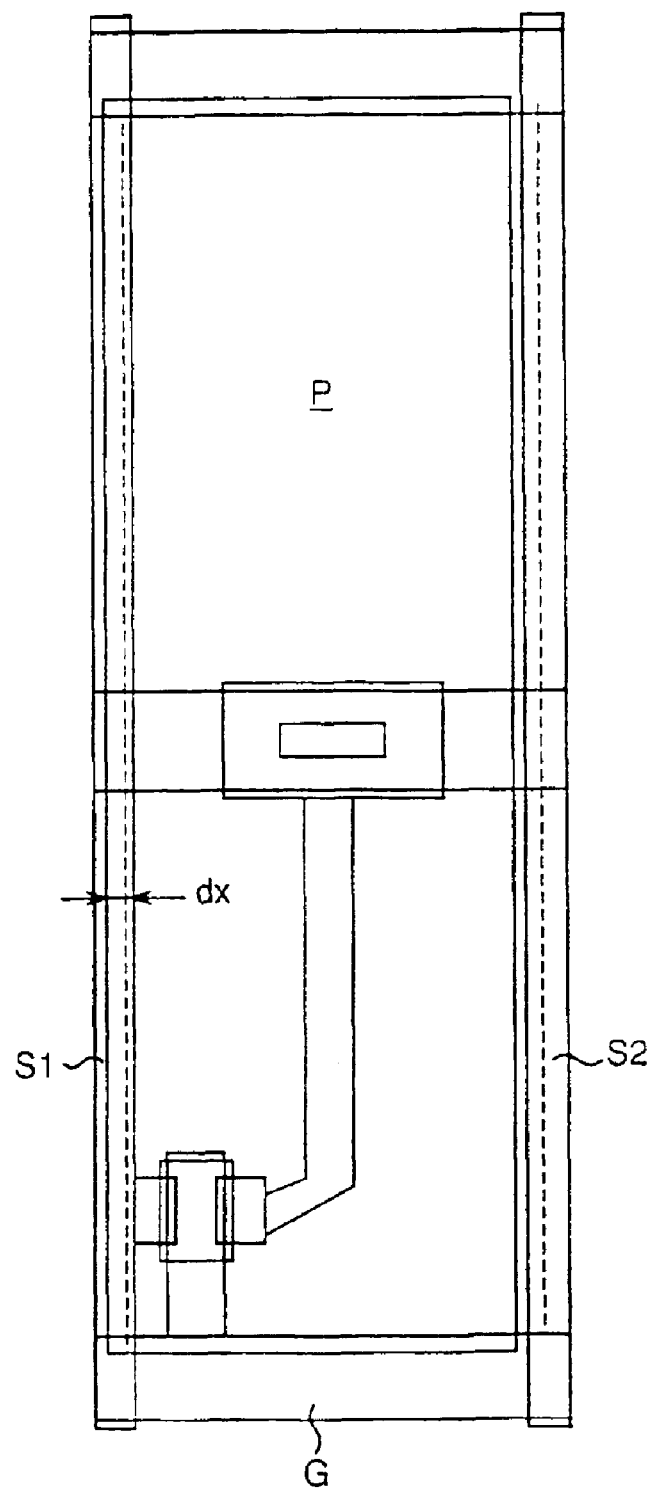
FIG. 30 is an explanatory view showing an alignment deviation or misalignment of a pixel electrode.
Figure 31:
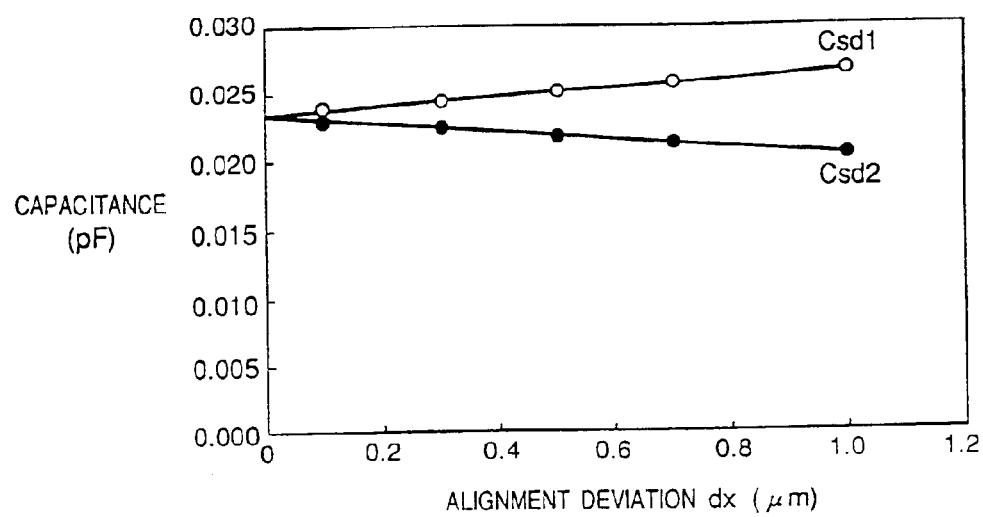
FIG. 31 shows the relationship between the alignment deviation of the pixel electrode and the capacitance between the pixel electrode and an adjacent signal line.
Figure 32:
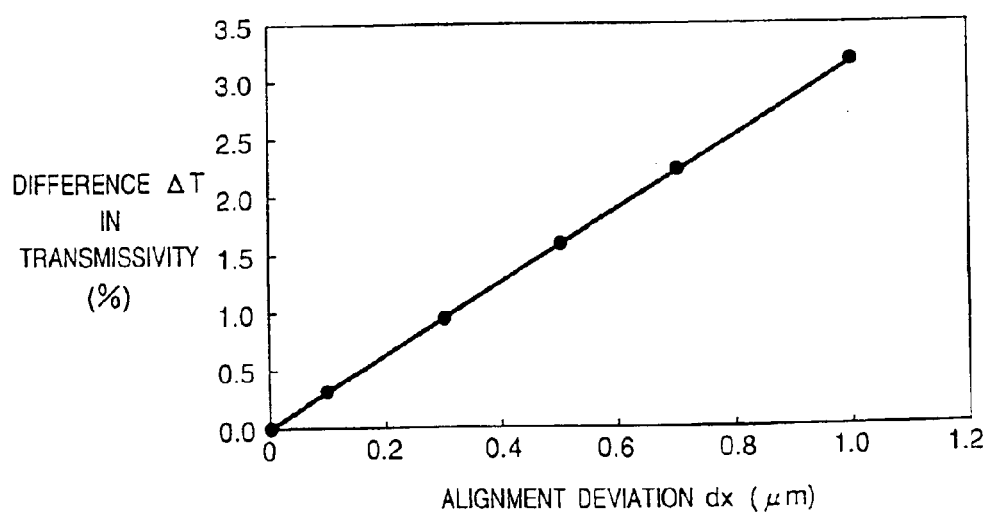
FIG. 32 shows the relationship between an alignment deviation and the difference in transmissivity between a block having the alignment deviation and a block having no alignment deviation.

Further, in the seventh embodiment, the pixel electrode 207 is formed rectangularly, similarly to the conventional active matrix type LCD apparatus shown in FIG. 28. Therefore, the color filter 212 and the black matrix 213 can be easily formed.

In the seventh embodiment, the auxiliary capacitor line 208 is located at the position where the pixel electrode 207 is bisected into the TFT 205-side part and the counter-TFT 205-side part. But, if the auxiliary capacitor line 208 cannot be disposed along the transverse center line of the pixel electrode 207, the auxiliary capacitor line 208 may be provided with electrode portions extending along the underside of each source line 204 to the bent portions thereof, as in the case of the sixth embodiment, so that the bent portions of the source lines 204 are placed above the electrode portions, which have an electric potential equal to that of the auxiliary capacitor line 208.

<Eighth Embodiment>

Figure 21:
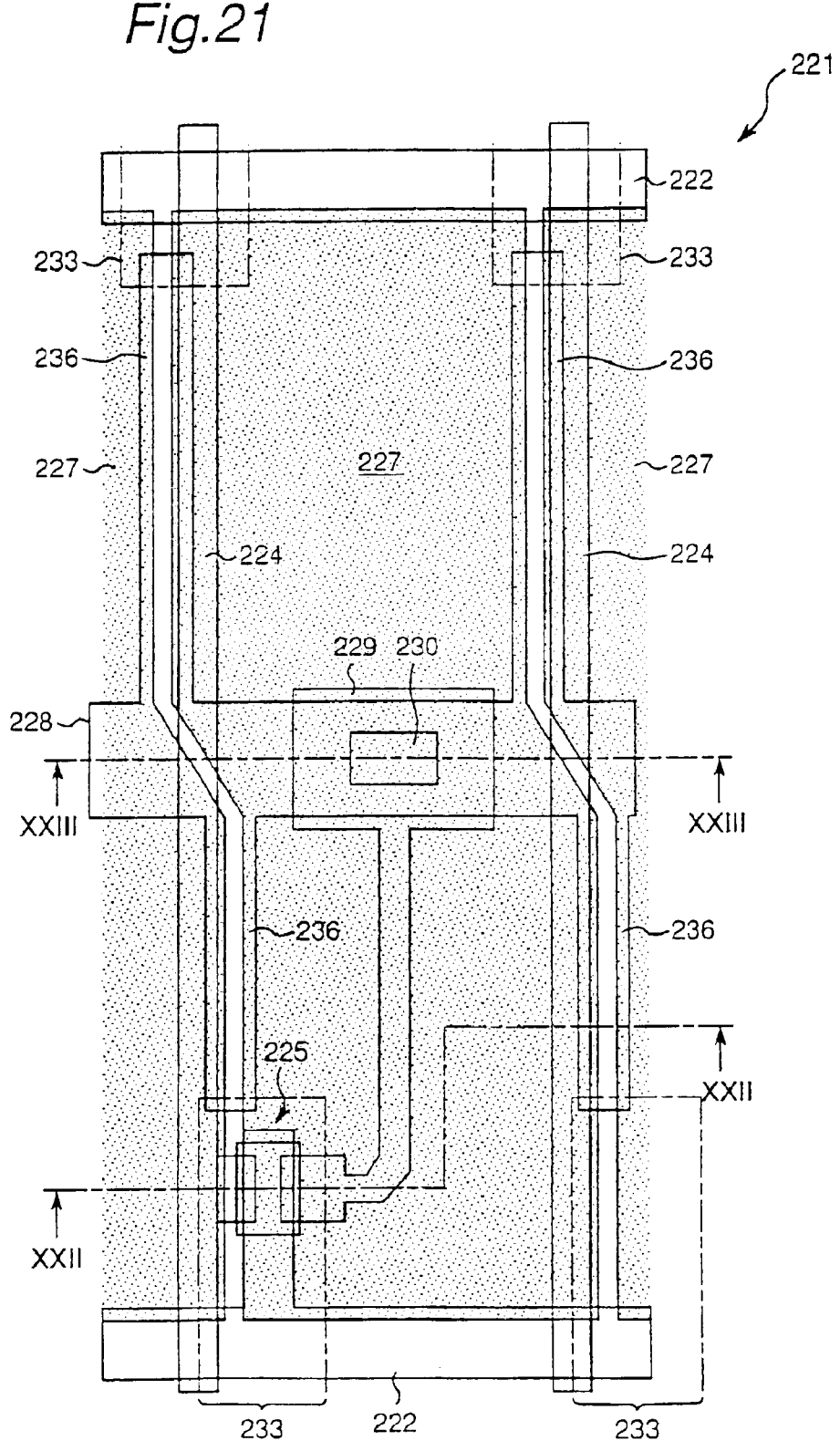
FIG. 21 is a plan view of an active matrix board in an eighth embodiment of the present invention.
Figure 22:
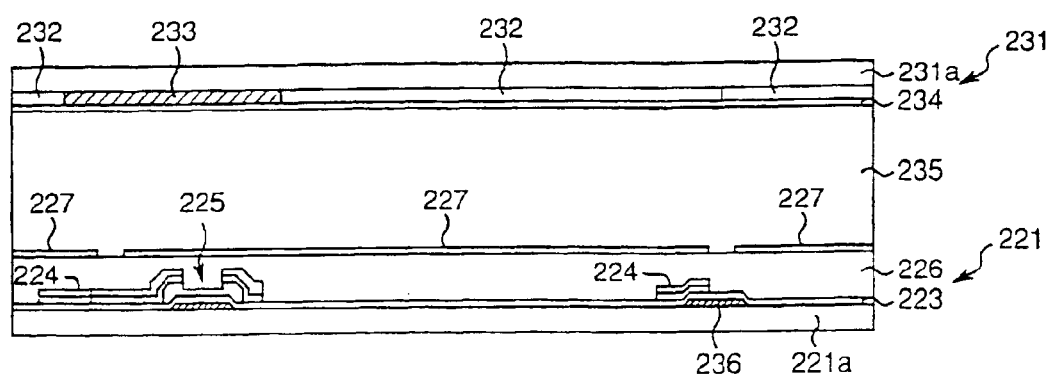
FIG. 22 is a sectional view taken along line XXII—XXII of FIG. 21.

FIG. 21 is a plan view of an active matrix board 221 of an active matrix type liquid crystal display apparatus (hereinafter referred to as simply an LCD apparatus) according to an eighth embodiment of the present invention. FIG. 22 is a sectional view taken along line XXII—XXII of FIG. 21, and FIG. 23 is a sectional view taken along line XXIII—XXIII of FIG. 21.

Figure 23:
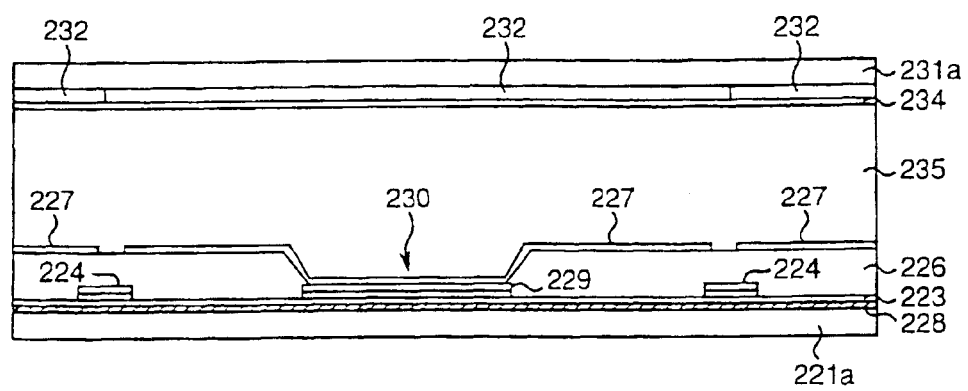
FIG. 23 is a sectional view taken along line XXIII—XXIII of FIG. 21.
Figure 24:
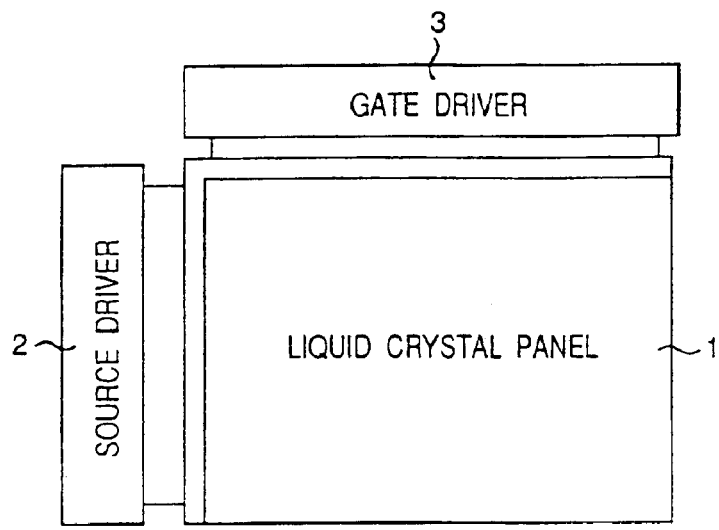
FIG. 24 is a plan view of a conventional active matrix type liquid crystal display apparatus.
Figure 25:
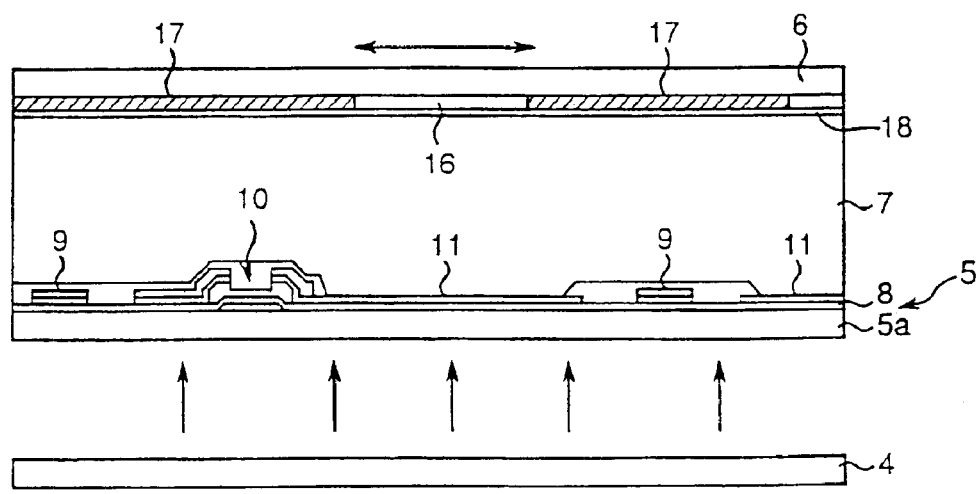
FIG. 25 is a sectional view showing a one-pixel part of the active matrix type liquid crystal display apparatus shown in FIG. 24.

Referring to FIGS. 21 to 23, the active matrix board 221 in the eighth embodiment has an insulation substrate 221a, gate lines 222, a gate insulation film 223, source lines 224, TFTs 225, an interlaminar insulation film 226, pixel electrodes 227, auxiliary capacitor electrodes 229, and contact holes 230 which have the same constructions and functions as the insulation substrate 151a, the gate lines 15, the gate insulation film 153, the source lines 154, 154', the TFTs 155, the interlaminar insulation film 161, the pixel electrodes 162, the auxiliary capacitor electrodes 164, and the contact holes 165 of the active matrix board in the fifth embodiment shown in FIGS. 12 to 14. Also, an opposed board 231 in the eighth embodiment has an insulation substrate 231a and an opposed electrode 234 which are the same constructions and functions as the insulation substrate 166a and the opposed electrode 169 of the opposed board 166 of the fifth embodiment. Also, a liquid crystal layer 235 in the eighth embodiment has the same construction and function as the liquid crystal layer 170 in the fifth embodiment.

In the eighth embodiment, a light shield film 236 made of the same material as that of the gate lines 222 is disposed in the same layer as the gate lines 222 to optically shield the gap between adjacent pixel electrodes 227 and 227. Thus, it is unnecessary to form the black matrix 233 on the opposed board 231 in a location corresponding to the gap between the adjacent pixel electrodes 227 and 227. Thus it is enough to form the black matrix 233 only in positions in which it confronts the TFTs 225.

The accuracy of the alignment between the active matrix board 221 and the opposed board 231 is generally about ±5 μm, whereas the accuracy of the alignment between the layers of the active matrix board 221 is less than ±1 μm. Thus, the light shield film 236 of the active matrix board 221 is allowed to be made smaller in width than the black matrix 233 that would be used without the light shield film 236. Also, because provision of the light shield film 236 eliminates the black matrix 233 in the corresponding locations in the opposed board, the area of the color filters 232 is increased, resulting in the improved aperture ratio.

Furthermore, because the area of the black matrix 233 disposed on the opposed board 231 is reduced, it is possible to widen the bonding margin between the active matrix board 221 and the opposed board 231.

The light shield film 236 is connected to the auxiliary capacitor line 228. Thus, owing to the field shield effect of the light shield film 236, it is possible to reduce the coupling capacitance Csd between the source line 224 and the pixel electrode 227 to thereby suppress the occurrence of the shadowing phenomenon due to the coupling capacitance Csd. Further, because the absolute amount of the coupling capacitance Csd decreases, there is also a reduction in the amount of change of the coupling capacitance Csd due to a misalignment between layers. Thus, it is possible to further suppress the occurrence of the "block separation". The light shield film 236 may be connected to the gate line 222. Also, the light shield film 236 does not have to be connected to the auxiliary capacitor line 228 or the gate line 222.

In the eighth embodiment, the construction in which the light shield film 236 is provided and the formation of the black matrix 233 is omitted owing to the provision of the light shield film 236 has been applied to the fifth embodiment. This construction may be applied to the sixth and seventh embodiments.

In the fifth to eighth embodiments, the bent portions (which are slant portions between the bents) of the pixel electrodes 162, 182, 227 and that of the source line 204 are formed in a longitudinally central position of the pixel electrodes 162, 182, 227, and 207, respectively. But, to suppress the occurrence of the shadowing phenomenon, the bent portion is not necessarily provided strictly in a central position of the pixel electrode. Accordingly, in the present invention, the position of the bent portion to be formed on the pixel electrode or the source line is not limited to the longitudinally central position of each pixel electrode.

Note that the source line (signal line) may have a portion not covered by the pixel electrode in the widthwise direction of the source line so long as the uncovered portion is narrow enough not to hinder the effects of the above embodiments from being achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix type liquid crystal display apparatus comprising:
   an insulation substrate;
   scanning lines formed on the insulation substrate;
   signal lines extending in a direction intersecting a direction in which the scanning lines extend;
   switching devices provided in the vicinity of each intersection of the scanning and signal lines such that the switching devices are arrayed in a matrix form;
   an interlaminar insulation film disposed on or above the scanning lines, the signal lines, and the switching devices;
   pixel electrodes formed on the interlaminar insulation film and arranged in a matrix form, each electrode being connected to an output terminal of an associated switching device,
   wherein only a part of each of opposite side portions of one pixel electrode widthwise covers two signal lines extending adjacent to the pixel electrode; and
   wherein each signal line is bent twice between two adjacent scanning lines such that two generally parallel but longitudinally displaced parts are formed, and these two parts are covered by opposed side portions of two adjacent pixel electrodes, respectively.

2. The active matrix type liquid crystal display apparatus according to claim 1, wherein each pixel electrode covers the associated switching device.

3. The active matrix type liquid crystal display apparatus according to claim 1, wherein each switching device is disposed in the vicinity of a gap between two adjacent pixel electrodes.

4. The active matrix type liquid crystal display apparatus according to claim 1, further comprising an opposed board having a black matrix, and wherein the black matrix is located between two adjacent pixel electrodes in such a manner that the black matrix overlaps each one of these pixel electrodes by at least an amount corresponding to an alignment margin of the opposed board relative to the insulation board.

5. The active matrix type liquid crystal display apparatus according to claim 4, wherein in a location where the signal line is covered by the pixel electrode, an edge of the black matrix is disposed along a center line of the pixel electrode or on an inner side of the pixel electrode than the center line.

6. The active matrix type liquid crystal display apparatus according to claim 1, further comprising a light shield film provided on the insulation substrate in such a manner that the light shield film spans a gap between the adjacent pixel electrodes.

7. The active matrix type liquid crystal display apparatus according to claim 5, further comprising a light shield film provided on the insulation substrate in such a manner that the light shield film spans a gap between the adjacent pixel electrodes.

8. An active matrix type liquid crystal display apparatus comprising:

an insulation substrate;

scanning lines formed on the insulation substrate;

signal lines extending in a direction intersecting direction in which the scanning lines extend;

switching devices provided in the vicinity of each intersection of the scanning and signal lines such that the switching devices are arrayed in a matrix form;

an interlaminar insulation film disposed on or above the scanning lines, the signal lines, and the switching devices;

pixel electrodes formed on the interlaminar insulation film and arranged in a matrix form, each electrode being connected to an output terminal of an associated switching device, wherein only a part of each of opposite side portions of one pixel electrode widthwise covers two signal lines extending adjacent to the pixel electrode;

wherein said parts of the pixel electrode covering the two signal lines adjacent to the pixel electrode are parts that overhang from side edges of the pixel electrode; and wherein both side edges of each pixel electrode are bent twice such that the overhanging parts are diagonally formed on the respective sides of the pixel electrode and these overhanging parts cover the two signal lines adjacent to the pixel electrode.

9. The active matrix type liquid crystal display apparatus according to claim 8, wherein a portion between the two bents of each side edge of the pixel electrode forms a slant.

10. An active matrix type liquid crystal display apparatus comprising:

an insulation substrate;

scanning lines formed on the insulation substrate;

auxiliary capacitor lines arranged parallel to the scanning lines;

signal lines extending in a direction intersecting a direction in which the scanning lines extend;

switching devices provided in the vicinity of each intersection of the scanning and signal lines such that the switching devices are arrayed in a matrix form;

an interlaminar insulation film disposed on or above the scanning lines, auxiliary capacitor lines, the signal lines, and the switching devices; and pixel electrodes formed on the interlaminar insulation film and arranged in a matrix form, each electrode being connected to an output terminal of the associated switching device, wherein both side edges of each pixel electrode are bent twice such that the overhanging parts are formed on the respective sides of the pixel electrode and these overhanging parts cover two signal lines adjacent to the pixel electrode, and wherein the auxiliary capacitor line underlies a portion between the two bents of each side edge of the pixel electrode.

11. The active matrix type liquid crystal display apparatus according to claim 10, further comprising a light shield film provided on the insulation substrate in such a manner that the light shield film spans a gap between the adjacent pixel electrodes.

12. The active matrix type liquid crystal display apparatus according to claim 11, wherein said light shield film is electrically connected to either the auxiliary capacitor line or the scanning line.

13. The active matrix type liquid crystal display apparatus according to claim 10, wherein the portion between the two bents of each side edge of the pixel electrode forms a slant.

14. The active matrix type liquid crystal display apparatus according to claim 10, wherein the auxiliary capacitor line includes electrode portions that extend toward a portion between the two bents of each side edge of the pixel electrode such that the electrode portions underlie the portions between the two bents of each side edge of the pixel electrode.

15. The active matrix type liquid crystal display apparatus according to claim 10, wherein the overhanging parts on both sides of the pixel electrodes have approximately same dimensions.

16. An active matrix type liquid crystal display apparatus comprising:

an insulation substrate;

scanning lines formed on the insulation substrate;

signal lines extending in a direction intersecting a direction in which the scanning lines extend;

switching devices provided in the vicinity of each intersection of the scanning and signal lines such that the switching devices are arrayed in a matrix form;

an interlaminar insulation film disposed on or above the scanning lines, auxiliary capacitor lines, the signal lines, and the switching devices;

pixel electrodes formed on the interlaminar insulation film and arranged in a matrix form, each electrode being connected to an output terminal of the associated switching device;

wherein between two adjacent scanning lines, each signal line has a first and second generally parallel but longitudinally displaced straight portions and a transition portion connecting the first and second straight portions;

wherein each pixel electrode has a shape of a rectangle that has two side portions extending along the first and second straight portions of neighboring two signal lines; and wherein one of the two sides of each pixel electrode covers the first portion of one of the two neighboring two signal lines, and the other side portion of the pixel electrode covers the second portion of the other of the two neighboring two signal lines.

* * * * *